United States Patent
Tanaka et al.

(10) Patent No.: US 9,202,135 B2
(45) Date of Patent: Dec. 1, 2015

(54) IMAGE PROCESSING DEVICE, IMAGE PROCESSING METHOD, CONTROL PROGRAM, AND RECORDING MEDIUM

(75) Inventors: Kiyoaki Tanaka, Kyoto (JP); Takayoshi Yamashita, Kyoto (JP); Takahiro Takayama, Shiga (JP)

(73) Assignee: OMRON Corporation, Kyoto (JP)

( * ) Notice: Subject to any disclaimer, the term of this patent is extended or adjusted under 35 U.S.C. 154(b) by 129 days.

(21) Appl. No.: 14/234,403

(22) PCT Filed: Mar. 13, 2012

(86) PCT No.: PCT/JP2012/056479
§ 371 (c)(1),
(2), (4) Date: Mar. 21, 2014

(87) PCT Pub. No.: WO2013/038732
PCT Pub. Date: Mar. 21, 2013

(65) Prior Publication Data
US 2014/0198953 A1    Jul. 17, 2014

(30) Foreign Application Priority Data
Sep. 15, 2011 (JP) .................................. 2011-202427

(51) Int. Cl.
G06K 9/00    (2006.01)
G06K 9/62    (2006.01)
G06K 9/32    (2006.01)

(52) U.S. Cl.
CPC .......... *G06K 9/6202* (2013.01); *G06K 9/00228* (2013.01); *G06K 9/00362* (2013.01); *G06K 9/3241* (2013.01)

(58) Field of Classification Search
CPC ............................ G06K 9/3241; G06K 9/6202
See application file for complete search history.

(56) References Cited

U.S. PATENT DOCUMENTS

| 8,515,184 B1 * | 8/2013 | Medasani ............ G06K 9/6257 382/181 |
| 2011/0002678 A1 * | 1/2011 | Misawa .................. G03B 7/00 396/63 |
| 2012/0106848 A1 * | 5/2012 | Greig ................. G06K 9/00677 382/195 |
| 2013/0243327 A1 * | 9/2013 | Tanaka ................. G06K 9/6254 382/190 |

FOREIGN PATENT DOCUMENTS

| JP | 2009-060379 A | 3/2009 |
| JP | 2009-289230 A | 12/2009 |

OTHER PUBLICATIONS

International Search Report issued in PCT/JP2012/056479 mailed on May 22, 2012 (2 pages).

* cited by examiner

Primary Examiner — Shefali Goradia
(74) Attorney, Agent, or Firm — Osha Liang LLP

(57) ABSTRACT

An image processing device configured to detect a detection target, which is all or a part of a predetermined main body on an image has a detection target detection unit that detects an estimated detection target that the image processing device assumes to be the detection target from the image, a heterogeneous target determination unit that determines whether the estimated detection target detected by the detection target detection unit is an estimated heterogeneous target that the image processing device assumes to be a heterogeneous target, which is all or a part of a main body different in class from the main body, and a detection target determination unit that determines whether the estimated detection target detected by the detection target detection unit is the detection target based on a determination result of the heterogeneous target determination unit.

20 Claims, 17 Drawing Sheets

|  | Detection target certainty degree | "Face of dog" detection | "Face of cat" detection | "Face of bird" detection |
|---|---|---|---|---|
| Pattern 1 | 1001~ | Not execute | Not execute | Not execute |
| Pattern 2 | 801~1000 | Execute | Not execute | Not execute |
| Pattern 3 | 601~800 | Execute | Execute | Not execute |
| Pattern 4 | ~600 | Execute | Execute | Execute |

Fig. 3

| Detection class | Weighting value |
|---|---|
| "Face of dog" detection | 0.8 |
| "Face of cat" detection | 0.8 |
| "Face of bird" detection | 1.4 |
| ⋮ | ⋮ |

| Candidate region | "Face of dog" detection | "Face of cat" detection | "Face of bird" detection |
|---|---|---|---|
| Candidate region 81 | ○ | × | × |
| Candidate region 82 | ○ | ○ | × |

| Candidate region | "Face of dog" detection | "Face of cat" detection | "Face of bird" detection |
|---|---|---|---|
| Candidate region A | ○ | ○ | ○ |
| Candidate region B | ○ | × | × |
| Candidate region C | ○ | ○ | × |
| Candidate region D | × | ○ | ○ |
| Candidate region E | × | × | × |
| Candidate region F | × | ○ | × |

Fig. 22

| Candidate region | "Face of dog" detection | | "Face of cat" detection | | "Face of bird" detection | |
|---|---|---|---|---|---|---|
| | Detection result | Heterogeneous target certainty degree | Detection result | Heterogeneous target certainty degree | Detection result | Heterogeneous target certainty degree |
| Candidate region G | ○ | 300 | ○ | 300 | ○ | 400 |
| Candidate region H | ○ | 200 | ○ | 200 | ○ | 200 |
| Candidate region I | ○ | 400 | ○ | 400 | × | |

IMAGE PROCESSING DEVICE, IMAGE PROCESSING METHOD, CONTROL PROGRAM, AND RECORDING MEDIUM

BACKGROUND

1. Technical Field

The present invention relates to an image processing device, an image processing method, a control program, and a recording medium for detecting a target such as a face of a person, and the like, from an image.

2. Related Art

In recent years, digital cameras, and the like are installed with a technique of detecting the face of a person, and the like, focusing on the detected target, and adjusting a white balance, and the like of the detected target at the time of photographing. In such technique, it is desirable to accurately detect the target such as the face of the person, and the like from the image. Thus, various techniques for enhancing the accuracy in detecting the target have been developed.

For example, patent document 1 describes a technique of executing a two-dimensional face detection process and a three-dimensional face detection process on an image, and identifying a target detected in either detection process as a face of a person when detecting the face of the person from the image.

Patent document 2 describes a technique of first executing the face detection process, executing a ear detection process on a predetermined region of the target detected by the face detection process, and identifying the target detected by the face detection process as the face when detected by the ear detection process when detecting the face of a person or an animal from the image.

Patent Document 1: Japanese Unexamined Patent Publication No. 2009-60379 (published Mar. 19, 2009)

Patent Document 2: Japanese Unexamined Patent Publication No. 2009-289230 (published Dec. 10, 2009)

SUMMARY

In the conventional techniques described above, however, there is a limit to the detection accuracy that can be enhanced.

In the conventional technique, a plurality of types of detection processes for detecting all or a part of a predetermined main body are executed and the target is detected based on the result when detecting all or a part of the relevant main body. The detection accuracy can be enhanced by increasing the number of types of detection processes to execute.

However, if the number of types of detection processes is increased to enhance the accuracy in detecting all or a part of the predetermined main body, the detection process time and a resource amount of a memory, and the like used for the detection process also increase in proportion to the number of types. Furthermore, even if the number of types of detection processes is increased, there is a limit to the enhancement of the detection accuracy as long as the detection process with the predetermined main body as the target is being carried out.

One or more embodiments of the present invention provides an image processing device, an image processing method, a control program, and a recording medium for effectively and efficiently enhancing the detection accuracy in detecting a target from an image.

In accordance with one or more embodiments of the present invention, an image processing device is an image processing device configured to detect a detection target, which is all or a part of a predetermined main body on an image, the image processing device including a detection target detection unit configured to detect an estimated detection target assumed to be the detection target from the image; a heterogeneous target determination unit configured to determine whether or not an estimated detection target detected by the detection target detection unit is an estimated heterogeneous target assumed to be a heterogeneous target, which is all or a part of a main body different in class from the main body; and a detection target determination unit configured to determine whether or not the estimated detection target detected by the detection target detection unit is the detection target based on a determination result of the heterogeneous target determination unit.

In accordance with one or more embodiments of the present invention, an image processing method is an image processing method configured to detect a detection target, which is all or a part of a predetermined main body on an image; the image processing method including the steps of detecting an estimated detection target assumed to be the detection target from the image; determining whether or not the estimated detection target detected in the detection target detecting step is an estimated heterogeneous target assumed to be a heterogeneous target, which is all or a part of a main body different in class from the main body; and determining whether or not the estimated detection target detected in the detection target detecting step is the detection target based on a determination result of the heterogeneous target determining step.

Generally, the detection target detection unit configured to detect a predetermined detection target has a possibility of detecting not only a desired detection target, but also a target different from the desired detection target as an estimated detection target. The detection accuracy can be enhanced by reducing the false detection of the detection target detection unit.

The image processing device and the image processing method according to one or more embodiments of the present invention, on the other hand, determine whether or not the estimated detection target detected by the detection target detection unit is the estimated heterogeneous target assumed to be the heterogeneous target, and determine whether or not the estimated detection target is the detection target based on the determination result.

If the estimated detection target is determined as the estimated heterogeneous target, the estimated detection target has a high possibility of being not the detection target but the heterogeneous target. If the estimated detection target is determined as not the estimated heterogeneous target, the estimated detection target has a high possibility of being not the heterogeneous target but the detection target.

Thus, for example, the estimated detection target is determined as not the detection target if the estimated detection target is determined as the estimated heterogeneous target, and the estimated detection target is determined as the detection target if the estimated detection target is determined as not the estimated heterogeneous target, so that the false detection can be effectively and efficiently reduced compared to the prior art. Therefore, an effect of effectively and efficiently enhancing the detection accuracy is obtained.

A target having a high possibility of false detection may exist according to the detection target. In this case, the target having a high possibility of false detection is set as the heterogeneous target, so that the false detection can be more efficiently reduced, and furthermore, the detection accuracy can be enhanced.

As described above, the image processing device according to one or more embodiments of the present invention has a configuration including a detection target detection unit configured to detect an estimated detection target assumed to be the detection target from the image; a heterogeneous target determination unit configured to determine whether or not an estimated detection target detected by the detection target detection unit is an estimated heterogeneous target assumed to be a heterogeneous target, which is all or a part of a main body different in class from the main body; and a detection target determination unit configured to determine whether or not the estimated detection target detected by the detection target detection unit is the detection target based on a determination result of the heterogeneous target determination unit.

Furthermore, the image processing method according to one or more embodiments of the present invention includes the steps of detecting an estimated detection target assumed to be the detection target from the image; determining whether or not the estimated detection target detected in the detection target detecting step is an estimated heterogeneous target assumed to be a heterogeneous target, which is all or a part of a main body different in class from the main body; and determining whether or not the estimated detection target detected in the detection target detecting step is the detection target based on a determination result of the heterogeneous target determining step.

Therefore, according to one or more embodiments of the present invention, an effect of effectively and efficiently enhancing the detection accuracy is obtained.

BRIEF DESCRIPTION OF THE DRAWINGS

FIG. 3 is a view illustrating an example of weighting information stored in the storage section of the image processing device;

FIG. 22 is a view illustrating the result of executing the face detection of the dog, the face detection of the cat, and the face detection of the bird with respect to the image including the region detected by the face detection of the person in the detection process for detecting the face of the person from the input image.

DETAILED DESCRIPTION

Embodiments of the present invention will be hereinafter described based on FIG. 1 to FIG. 22. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Configuration of Image Processing Device]

First, an image processing device will be described based on FIG. 1. The image processing device detects a detection target, which is all or a part of a predetermined main body on an image. The detection target is an arbitrary material object on the image, for example, body, face, eye, nose, mouth, hand, arm, leg etc. of a person, body, face etc. of an animal such as a dog, cat, and bird, entire vehicle body, tire, etc. of an automobile, motorcycle, etc., building structure such as building, establishment, etc.; or a natural object such as a tree, cloud, sun, etc. If the detection target is the "face of a person", for example, the main body of the detection target is the "person". If the detection target is the "face of a dog", the main body of the detection target is the "dog". If the detection target is the "tire of an automobile", the main body of the detection target is the "automobile".

The image processing device merely needs to be able to detect a detection target on the image, and may be, for example, a PC, a digital camera, a portable telephone, a PDA (Personal Digital Assistant), a game machine, a device for photographing and printing a picture, a device for editing images, and the like.

Figures 1, 2:
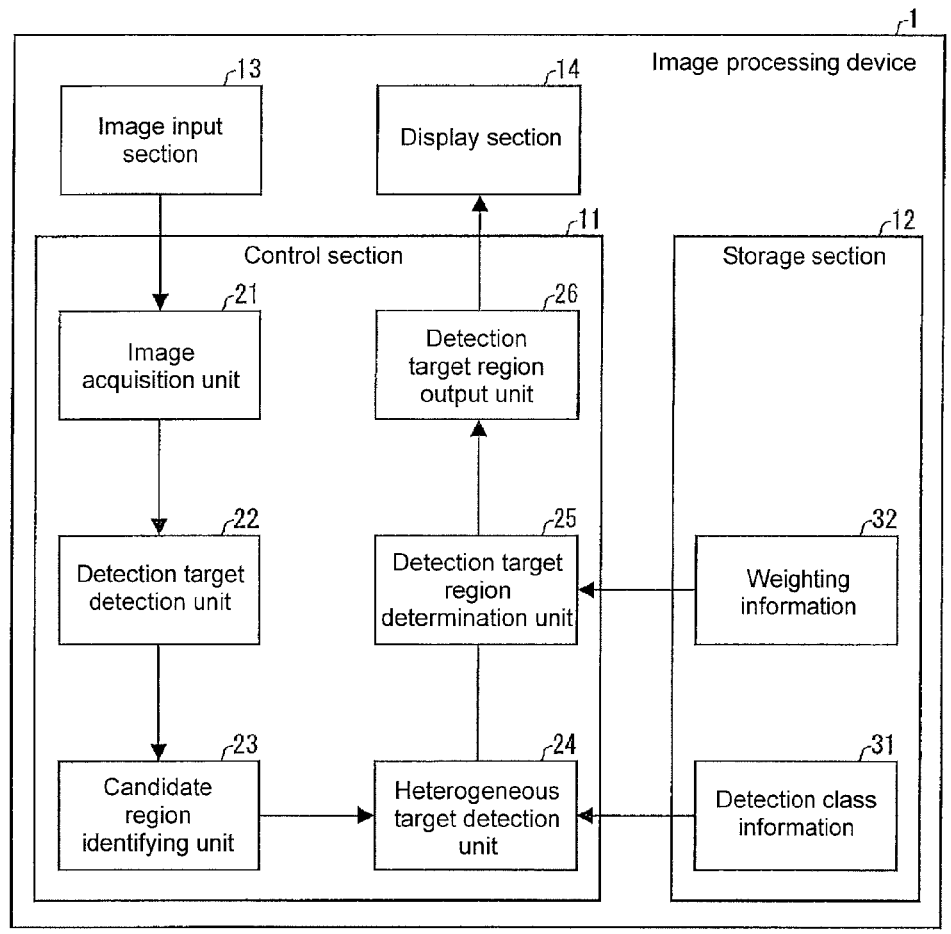
FIG. 1 is a block diagram illustrating one or more embodiments of the present invention, and illustrates one example of a configuration of the main parts of an image processing device.
FIG. 2 is a view illustrating an example of detection class information stored in a storage section of the image processing device.

FIG. 1 is a block diagram illustrating one example of a configuration of the main parts of an image processing device 1. As illustrated in FIG. 1, the image processing device 1 includes a control section 11, a storage section 12, an image input section 13, and a display section 14. The image processing device 1 may include members such as a communication section for communicating with other devices, an operation section for enabling the user to operate the image processing device, an audio input section, an audio output section, and the like, but such members are not illustrated.

The image input section 13 receives an image from an external image providing device (not illustrated). The image providing device merely needs to be a device that provides a holding image or an acquired image to another device. For example, the image providing device may be a digital camera, a PC, a portable telephone, a PDA, a game machine, a digital television, a storage device such as a USB (Universal Serial Bus) memory, and the like. The image processing device 1 may be mounted with a camera in place of the image input section 13.

The display section 14 displays the image in accordance with the instruction of the control section 11. The display section 14 merely needs to be able to display the image in accordance with the instruction of the control section 11, and an LCD (Liquid Crystal Display), an organic EL display, a plasma display, and the like, for example, may be applied.

The control section 11 executes a program read out from the storage section 12 to a temporary storage section (not illustrated) to carry out various types of computations and to comprehensively control each section of the image processing device 1.

In one or more embodiments of the present invention, the control section 11 is configured to include, as function blocks, an image acquisition unit 21, a detection target detection unit (detection target detection unit) 22, a candidate region identifying unit 23, a heterogeneous target detection unit (heterogeneous target determination unit) 24, a detection target region determination unit (detection target determination unit) 25, and a detection target region output unit 26. Each function block (21 to 26) of the control section 11 is realized by having a CPU (Central Processing Unit) read out the program stored in the storage device realized by a ROM (Read Only Memory) and the like to the temporary storage section realized by a RAM (Random Access Memory) and the like, and execute the same.

The image acquisition unit 21 acquires the image input through the image input section 13. The image acquisition unit 21 outputs the acquired image to the detection target detection unit 22. If the image is stored in the storage section 12, the image acquisition unit 21 may read out the image from the storage section 12.

The detection target detection unit 22 detects a target assumed to be the detection target from the image acquired by the image acquisition unit 21. In other words, the detection target detection unit 22 detects not only a target that completely matches the detection target from the image, but also a target similar to the detection target, a target in which one or a plurality of feature points matches or is similar to the detection target, and the like. The target assumed to be the detection target is hereinafter referred to as an estimated detection target. A method for the detection target detection unit 22 to detect the estimated detection target from the image may be arbitrary.

The detection target detection unit 22 may specify a certainty degree of the estimated detection target being the corresponding detection target when detecting the estimated detection target from the image. The certainty degree specified by the detection target detection unit 22 is hereinafter referred to as a detection target certainty degree. The detection target certainty degree indicates an extent that the estimated detection target is the detection target, and for example, may be a similarity degree indicating the extent that the estimated detection target is similar to the detection target. The similarity degree may be calculated by comparing the feature points of the estimated detection target and the feature points of the detection target.

When the detection target detection unit 22 detects the estimated detection target from the image, the candidate region identifying unit 23 identifies a region on the image including the estimated detection target for each estimated detection target that is detected. The region including the estimated detection target identified by the candidate region identifying unit 23 is hereinafter referred to as a candidate region. If the detection target detection unit 22 detects a plurality of estimated detection targets from the image, the candidate region identifying unit 23 identifies a plurality of candidate regions respectively including the respective estimated detection target. The candidate region identifying unit 23 outputs the candidate region information indicating the identified candidate region to the heterogeneous target detection unit 24 and the detection target region determination unit 25.

The candidate region may be of any shape as long as it is a region that includes one estimated detection target. For example, the candidate region identifying unit 23 may assume a region enclosed with a contour of the estimated detection target as a candidate region of the estimated detection target. Furthermore, the candidate region identifying unit 23 may assume a region within a predetermined distance from the contour of the estimated detection target as a candidate region of the estimated detection target. Moreover, the candidate region identifying unit 23 may assume a region within a rectangle including all the feature points of the estimated detection target as a candidate region.

The candidate region information is information indicating position and size of the candidate region, and for example, may be information indicating coordinates of the points at four corners of a rectangle surrounding the estimated detection target on the image or may be information indicating the coordinate of an end point of the rectangle and the size of the rectangle. The candidate region information may also be information indicating a contour of the estimated detection target.

The candidate region identifying unit 23, for example, generates candidate region information based on a position of the contour (edge) of the estimated detection target, and generates candidate region information based on a position of one or a plurality of feature points of the estimated detection target.

When the detection target detection unit 22 specifies the certainty degree of the estimated detection target, the candidate region identifying unit 23 associates detection target certainty degree information indicating the certainty degree of the estimated detection target with the candidate region information indicating the candidate region including the estimated detection target.

The heterogeneous target detection unit 24 acquires the candidate region information from the candidate region identifying unit 23, and detects a target assumed to be all or a part of a main body different in class from the main body of the detection target from the candidate region indicated by the acquired candidate region information. Hereinafter, all or a part of the main body different in class from the main body of the detection target is referred to as a heterogeneous target, and the target assumed to be the heterogeneous target is referred to as an estimated heterogeneous target. If a plurality of candidate region information are acquired from the candidate region identifying unit 23, the heterogeneous target detection unit 24 detects each estimated heterogeneous target from each candidate region.

In other words, the heterogeneous target is an arbitrary material object (target) on the image, and differs from the detection target in the class of the main body. For example, if the detection target is the "face of a dog", the heterogeneous target may be the "face of a person", and the like. If the detection target is the "face of a person", the heterogeneous target may be the "face of a dog", "face of a cat", "face of a bird", "tire of an automobile", and the like. If the detection target is the "body of a person", the heterogeneous target may be a "tree", and the like. If the detection target is the "entire vehicle body of an automobile", the heterogeneous target may be "entire vehicle body of a motorcycle", and the like.

For example, when a person is classified and defined as "adult" if a height of a person is greater than or equal to a predetermined value, and as "child" if a height of a person is smaller than the predetermined value, the class of the main body differs between the "whole body of an adult" and the "whole body of a child", which is the target. In this case, if the detection target is the "whole body of an adult", the heterogeneous target may be the "whole body of a child", and the like.

The heterogeneous target may be an arbitrary target, but the target having a high possibility of being falsely detected when the detection target is detected is desirably assumed as the heterogeneous target. Thus, the detection accuracy of the detection target can be effectively enhanced by selecting the heterogeneous target.

In one or more embodiments of the present invention, the class of the target differs when the target to detect (detection target or heterogeneous target) or the main body of the target differs. In other words, the target "face of a person" and "face of a dog" match in that the portion is the "face" but differ in the main body of the target, and thus the class of the target is different. Furthermore, the target "face of a person" and "whole body of a person" match in the main body but differ in all or a part of the main body, and thus the class of the target is different.

The heterogeneous target detection unit 24 may detect the estimated heterogeneous targets of a plurality of classes from one candidate region. The estimated heterogeneous targets are classified by the range of the estimated heterogeneous target assumed to be the heterogeneous target. That is, if the range of the two estimated heterogeneous targets differs, they are assumed as estimated heterogeneous targets of different classes. The class of the estimated heterogeneous target obviously differs if the class of the heterogeneous target is different, and the range of the estimated heterogeneous target may differ even if the class of the heterogeneous target is the same if the detection method is different. In other words, the class (detection class) of the detection executed by the heterogeneous target detection unit 24 is classified according to the class of the heterogeneous target, which is the target to detect, and the detection method with which to detect. The range of the estimated heterogeneous target is the same if the detection class of the heterogeneous target detection unit 24 is the same, and the range of the estimated heterogeneous target is different and the sectionalization of the detection class and the class of the estimated heterogeneous target match if the detection class is different.

For example, if the heterogeneous target is the "face of a dog", and the methods for detecting the "face of the dog" includes three types A, B, and C, the range of the estimated heterogeneous target detected with the detection methods A, B, C respectively differs. Thus, in this case, the heterogeneous target detection unit 24 detects each of the three types of estimated heterogeneous targets from the candidate region. Similar to the detection target detection unit 22, the method for the heterogeneous target detection unit 24 to detect the estimated heterogeneous target from the region may be arbitrary. Hereinafter, the heterogeneous target detection unit 24 is assumed to perform the detection with a predetermined method regardless of the heterogeneous target unless otherwise stated.

When acquiring the candidate region information and the detection target certainty degree information from the candidate region identifying unit 23, the heterogeneous target detection unit 24 may determine the content of class and/or number of classes of the estimated heterogeneous target, which is the target to detect from the candidate region indicated by the candidate region information, based on the detection target certainty degree indicated by the detection target certainty degree information associated with the candidate region information. In other words, the heterogeneous target detection unit 24 may determine the content of the detection class and/or number of classes based on the detection target certainty degree.

Specifically, the heterogeneous target detection unit 24 reads out the detection class information 31, in which the detection target certainty degree and the content of the detection class and/or number of class are associated, from the storage section 12, and specifies the content of the detection class and/or number of classes corresponding to the detection target certainty degree indicated by the acquired detection target certainty degree information with reference to the read detection class information 31. The heterogeneous target detection unit 24 executes the detection of the heterogeneous target based on the specified content of the detection class and/or number of classes.

For example, when the certainty degree of the estimated detection target is high, the heterogeneous target detection unit 24 executes the detection of the heterogeneous target by limiting to the heterogeneous target having a high possibility of false detection at the time of detection of the detection target or reducing the number of classes of the heterogeneous target since the possibility that the estimated detection target is the detection target is high. When the certainty degree of the estimated detection target is low, on the other hand, the heterogeneous target detection unit 24 executes the detection of the heterogeneous target by also having the heterogeneous target having a low possibility of false detection at the time of detection of the detection target as the target of detection or increasing the number of classes of the heterogeneous target since the possibility that the estimated detection target is the detection target is low.

When detecting the estimated heterogeneous target from the candidate region, the heterogeneous target detection unit 24 outputs the estimated heterogeneous target information indicating the estimated heterogeneous target that is detected to the detection target region determination unit 25 in correspondence with the candidate region information indicating the candidate region in which the estimated heterogeneous target is detected. When detecting the estimated heterogeneous targets of a plurality of classes from the candidate region, the heterogeneous target detection unit 24 associates a plurality of estimated heterogeneous target information, each indicating the estimated heterogeneous target of a plurality of classes, with the candidate region information.

In other words, the heterogeneous target detection unit 24 determines whether or not the estimated detection target included in the candidate region identified by the candidate region identifying unit 23 is the estimated heterogeneous target assumed to be the heterogeneous target, which is all or a part of the main body different in class from the main body of the detection target. The heterogeneous target detection unit 24 outputs the heterogeneous target determination result information indicating whether or not the estimated heterogeneous target to the detection target region determination unit 25 in correspondence with the candidate region information indicating the determined candidate region.

When detecting the estimated heterogeneous target from the candidate region, the heterogeneous target detection unit 24 may specify the certainty degree of the estimated heterogeneous target being the corresponding heterogeneous target for every estimated heterogeneous target. Hereinafter, the certainty degree specified by the heterogeneous target detection unit 24 is referred to as a heterogeneous target certainty degree. The heterogeneous target certainty degree indicates the extent that the estimated heterogeneous target is the heterogeneous target, and for example, may be a similarity degree indicating the extent that the estimated heterogeneous target is similar to the heterogeneous target. The similarity degree may be calculated by comparing the feature points of the estimated heterogeneous target and the feature points of the heterogeneous target.

When the heterogeneous target certainty degree is specified, the heterogeneous target detection unit 24 outputs the estimated heterogeneous target information indicating the estimated heterogeneous target that is detected and the heterogeneous target certainty degree information indicating the specified heterogeneous target certainty degree to the detection target region determination unit 25 in correspondence with the candidate region information indicating the candidate region in which the estimated heterogeneous target is detected.

The detection target region determination unit 25 acquires the estimated heterogeneous target information (heterogeneous target determination result information) and the candidate region information from the heterogeneous target detection unit 24, and determines whether or not the estimated detection target included in the candidate region identified by the candidate region identifying unit 23 is the detection target based on the acquired estimated heterogeneous target information. The detection target region determination unit 25 identifies the candidate region (candidate region including the estimated detection target determined to be the detection target) including the detection target as the detection target region as a result of the determination, and outputs the detection target region information indicating the detection target region to the detection target region output unit 26.

Specifically, if the estimated heterogeneous target information is associated with the candidate region information acquired from the heterogeneous target detection unit 24, the detection target region determination unit 25 determines that the estimated detection target included in the candidate region indicated by the candidate region information is not the detection target, and identifies that the relevant candidate region is not the detection target region. In other words, the detection target region determination unit 25 identifies the candidate region in which the heterogeneous target detection unit 24 detected the estimated heterogeneous target as a removing region that is not the detection target region. When the heterogeneous target detection unit 24 detects the estimated heterogeneous targets of a plurality of classes, the detection target region determination unit 25 identifies the candidate region in which the heterogeneous target detection unit 24 detected either estimated heterogeneous target as the removing region that is not the detection target region. The detection target region determination unit 25 may identify the candidate region in which none of the estimated heterogeneous targets are detected as the detection target region.

If a predetermined estimated heterogeneous target information is associated with the candidate region information acquired from the heterogeneous target detection unit 24, the detection target region determination unit 25 determines that the estimated detection target included in the candidate region indicated by the candidate region information is not the detection target, and identifies that the relevant candidate region is not the detection target region. In other words, the detection target region determination unit 25 identifies the candidate region in which the heterogeneous target detection unit 24 detected the estimated heterogeneous target of a predetermined class as the removing region that is not the detection target region. The detection target region determination unit 25 may identify the candidate region in which the estimated heterogeneous target of the predetermined class is not detected as the detection target region.

When the heterogeneous target detection unit 24 detects the estimated heterogeneous targets of a plurality of classes, the detection target region determination unit 25 determines that the estimated detection target included in the candidate region indicated by the candidate region information is not the detection target, and determines that the relevant candidate region is not the detection target region if a predetermined number of estimated heterogeneous target information is associated with the candidate region information acquired from the heterogeneous target detection unit 24. In other words, the detection target region determination unit 25 identifies the candidate region in which the heterogeneous target detection unit 24 detected the estimated heterogeneous targets of a predetermined number of classes as the removing region that is not the detection target region. The detection target region determination unit 25 may identify the candidate region in which the estimated heterogeneous targets of the predetermined number of classes are not detected as the detection target region.

For example, if the estimated heterogeneous target information of a number greater than or equal to half the number of classes of the estimated heterogeneous target to be detected by the heterogeneous target detection unit 24 is associated with the candidate region information acquired from the heterogeneous target detection unit 24, the detection target region determination unit 25 identifies the candidate region indicated by the candidate region information as the removing region that is not the detection target region. If the estimated heterogeneous target information of a number less than half the number of classes of the estimated heterogeneous target to be detected by the heterogeneous target detection unit 24 is associated with the candidate region information acquired from the heterogeneous target detection unit 24, the detection target region determination unit 25 may identify the candidate region indicated by the candidate region information as the detection target region.

If the estimated heterogeneous target information and the heterogeneous target certainty degree information are associated with the candidate region information acquired from the heterogeneous target detection unit 24, the detection target region determination unit 25 may determine that the estimated detection target included in the candidate region indicated by the candidate region information is not the detection target, and identify the relevant candidate region as the removing region that is not the detection target region if a certainty degree total value, in which the heterogeneous target certainty degree of each estimated heterogeneous target is totalized, is greater than or equal to a predetermined threshold value. If the certainty degree total value is smaller than the predetermined threshold value, the detection target region determination unit 25 may identify the relevant candidate region as the detection target region.

If the estimated heterogeneous target information, the heterogeneous target certainty degree information, and the detection target certainty degree information are associated with the candidate region information acquired from the heterogeneous target detection unit 24, the detection target region determination unit 25 may compare the certainty degree total value, in which the heterogeneous target certainty degree of each estimated heterogeneous target is totalized, and the detection target certainty degree, and determine whether or not the estimated detection target included in the candidate region indicated by the candidate region information is the detection target. For example, if the certainty degree total value in which the heterogeneous target certainty degrees are totalized is greater than the detection target certainty degree, the detection target region determination unit 25 determines that the estimated detection target included in the candidate region indicated by the candidate region information is not the detection target, and identifies the relevant candidate region as the removing region that is not the detection target region. Furthermore, for example, if a value obtained by subtracting the detection target certainty degree from the certainty degree total value, in which the heterogeneous target certainty degrees are totalized, is greater than or equal to a predetermined value, the detection target region determination unit 25 determines that the estimated detection target region included in the candidate region indicated by the candidate region information is not the detection target and identifies the relevant candidate region as the removing region that is not the detection target region.

The detection target region determination unit 25 may read out weighting information 32 indicating a weighting value of each estimated heterogeneous target from the storage section 12, multiply the weighting value to the heterogeneous target certainty degree of each estimated heterogeneous target based on the weighting value indicated by the read weighting information 32, and totalize the multiplied values to calculate the certainty degree total value.

The detection target region determination unit 25 determines that the estimated detection target other than the estimated detection target determined as not the detection target is the detection target, and identifies the candidate region including the relevant estimated detection target as the detection target region.

The detection target region output unit 26 displays on the display section 14 a region indicated by the detection target region information acquired from the detection target region determination unit 25 so as to overlap the image acquired from the image acquisition unit 21.

The storage section 12 stores the program, data, and the like to be referenced by the control section 11, and for example, stores the detection class information 31, the weighting information 32, and the like. An example of the detection class information 31 and the weighting information 32 stored in the storage section 12 will be described based on FIGS. 2 and 3. FIG. 2 is a view illustrating an example of the detection class information 31. FIG. 3 is a view illustrating an example of the weighting information 32.

The detection class information 31 is the information in which the detection target certainty degree and the content and the number of classes of the detection class are associated with each other. In other words, the detection class information 31 is the information in which the detection target certainty degree, and the content of class and the number of class of the estimated detection target are associated with each other. Specifically, as illustrated in FIG. 2, the detection target certainty degree is classified into four ranges of "smaller than or equal to 600", "601 to 800", "801 to 1000", and "greater than or equal to 1001", and the presence or absence of the execution of each detection class is associated with each range of the detection target certainty degree.

In the example illustrated in FIG. 2, for pattern 1, if the detection target certainty degree is greater than or equal to 1001, the heterogeneous target detection unit 24 does not execute any of the "face of a dog" detection, the "face of a cat" detection, and the "face of a bird" detection. If the detection target certainty degree is between 801 and 1000, the heterogeneous target detection unit 24 executes only the "face of a dog" detection. If the detection target certainty degree is between 601 and 800, the heterogeneous target detection unit 24 executes the "face of a dog" detection and the "face of a cat" detection. If the detection target certainty degree is smaller than or equal to 600, the heterogeneous target detection unit 24 executes the "face of a dog" detection, the "face of a cat" detection, and the "face of a bird" detection.

In the example illustrated in FIG. 2, the content and the number of classes of the detection class executed by the heterogeneous target detection unit 24 are associated for every range of the detection target certainty degree, but this is not the sole case. For example, only the content of the detection class executed by the heterogeneous target detection unit 24 may be associated for every range of the detection target certainty degree, or only the number of classes of the detection class executed by the heterogeneous target detection unit 24 may be associated for every range of the detection target certainty degree.

In the detection class information 31, if only the content of the detection class executed by the heterogeneous target detection unit 24 is associated for every range of the detection target certainty degree, the heterogeneous target detection unit 24 merely needs to execute at least the detection indicated by the content of the detection class specified by the detection class information 31, and the number of classes of the detection class to execute may be arbitrary. That is, if there are two types for the detection class specified by the detection class information 31, the detection of the specified two types of detection classes is to be executed, and other detection class may be executed or may not be executed.

In the detection class information 31, if only the number of classes of the detection class executed by the heterogeneous target detection unit 24 is associated for every range of the detection target certainty degree, the heterogeneous target detection unit 24 merely needs to execute the detection by the number of classes of the detection class specified by the detection class information 31, and the content of the detection class to execute may be arbitrary.

In the example illustrated in FIG. 2, the detection target certainty degree is classified into four ranges, but is not limited thereto, and the upper limit value, lower limit value, and number of classifications of the range of the detection certainty degree can be arbitrarily set.

As illustrated in FIG. 3, the weighting information 32 is the information in which the detection class (estimated heterogeneous target) and the weighting value are associated with each other. In the example illustrated in FIG. 3, the weighting value for the "face of a dog" detection is 0.8, the weighting value for the "face of a cat" detection is 0.8, and the weighting value for the "face of a bird" detection is 1.4.

The value of the weighting value to set to the detection class may be arbitrary. However, it is desirably set based on the detection accuracy, and the like of the detection target and the detection class. For example, assume that there are a heterogeneous target having a high possibility of false detection and a heterogeneous having a low possibility of false detection at the time of detection of the detection target with respect to a certain detection target. In this case, the false detection can be efficiently reduced by setting the weighting value of the detection class for detecting the heterogeneous target having a high possibility of false detection to a large value, and setting the weighting value of the detection class for detecting the heterogeneous target having a low possibility of false detection to a small value.

For example, assume that there is a detection class having a high detection accuracy and a detection class having a low detection accuracy. In this case, the false detection can be efficiently reduced by setting the weighting value of the detection class having a high detection accuracy to a large value, and setting the weighting value of the detection class having a low detection accuracy to a small value.

As described above, for example, if the heterogeneous target is the "face of a dog" and the method of detecting the "face of a dog" includes three types A, B, C, three types of detection classes (estimated heterogeneous target) of the "face of the dog" detection A, the "face of the dog" detection B, and the "face of the dog" detection C can be assumed. In this case, different weighting values may be set with respect to the "face of the dog" detection A, the "face of the dog" detection B, and the "face of the dog" detection C.

[Detection Process]

The detection process for detecting the detection target executed by the image processing device 1 will now be described based on FIG. 4 to FIG. 22. First, the detection process example (first example) for detecting the face of a pet from an image will be described based on FIG. 4 to FIG. 9. The detection process example (second example) for detecting the face of a person from the image will be described based on FIG. 10 to FIG. 15. The detection process example (third example) for detecting the face of a person from the image will be described based on FIGS. 5 and 16 to 20. The determination process example (fourth example) in which the detection target region determination unit 25 determines whether or not the detection target region will be described based on FIG. 21. Lastly, another determination process example (fifth example) in which the detection target region determination unit 25 determines whether or not the detection target region will be described based on FIG. 22.

[First Example]

Figure 4:
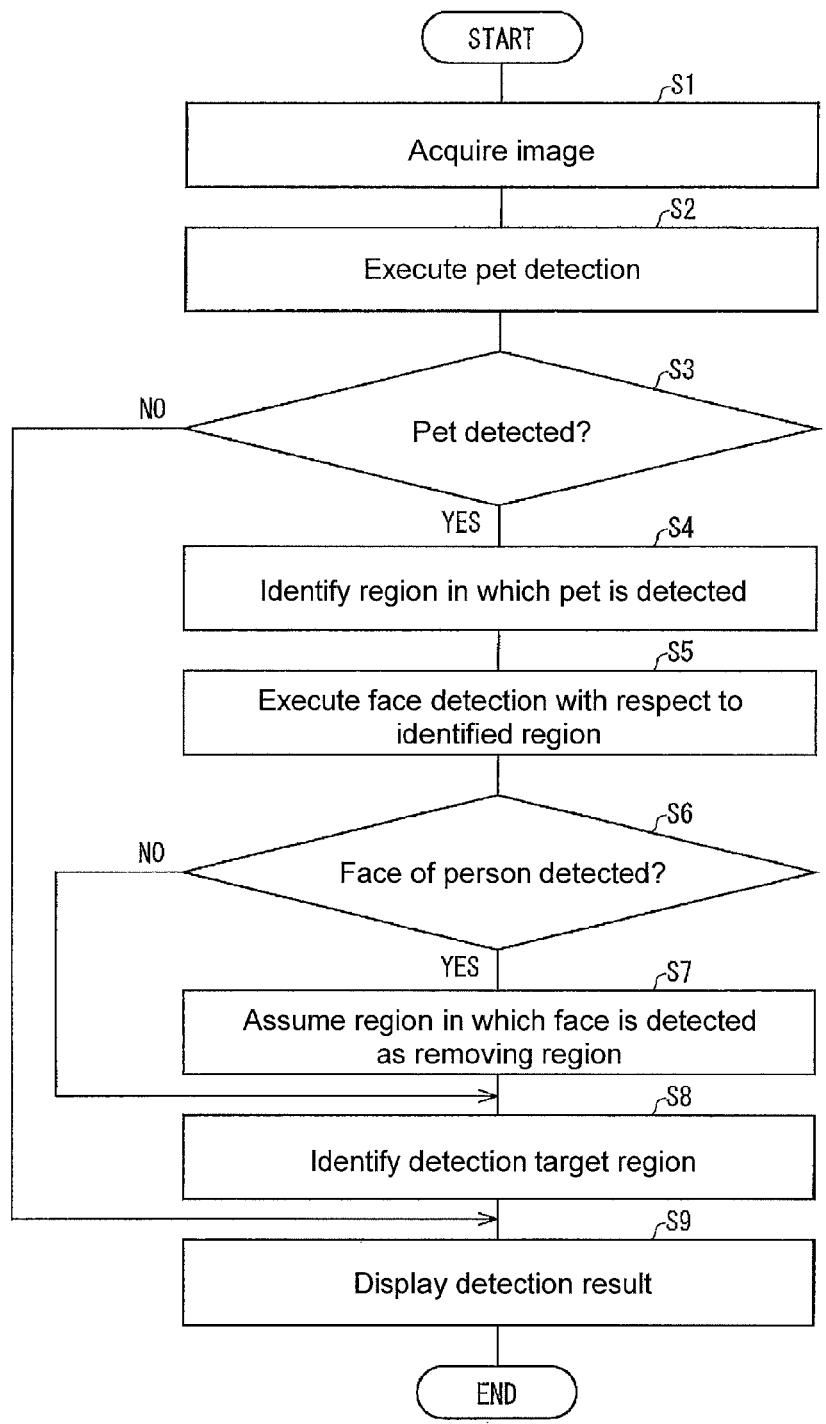
FIG. 4 is a view illustrating an example of a detection process for detecting a pet from an input image.
Figure 5:
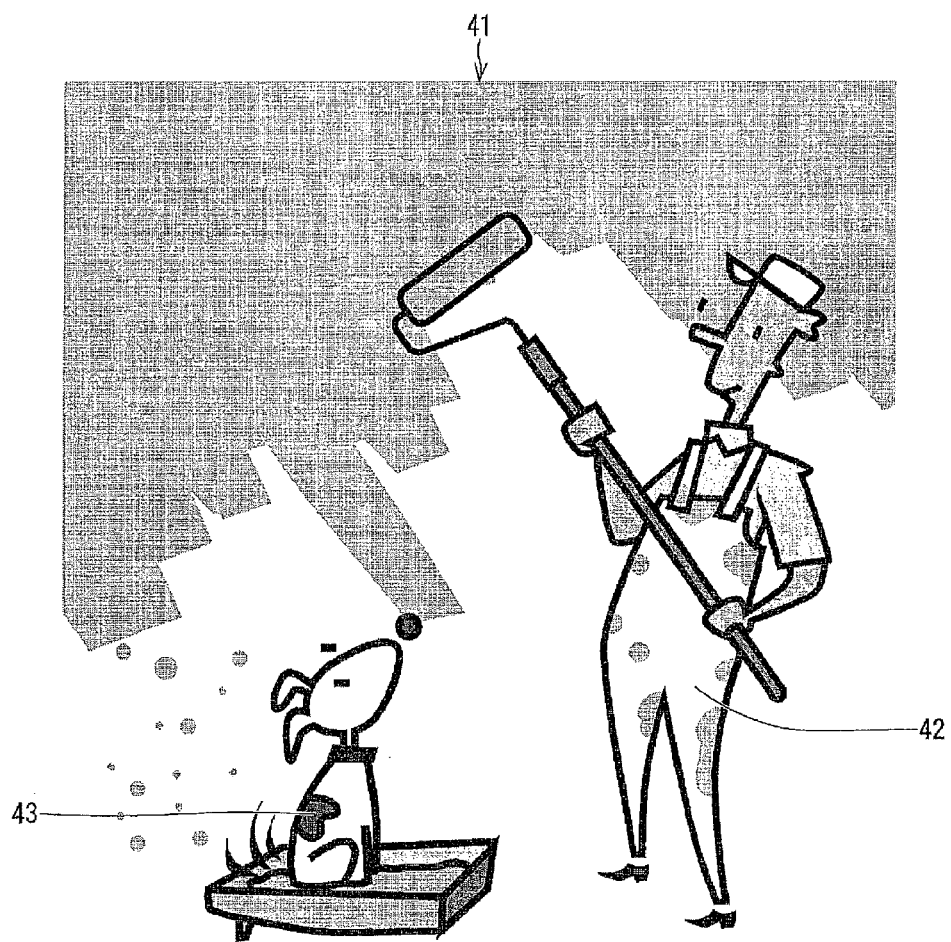
FIG. 5 is a view illustrating an input image used in the detection process.

First, the detection process example for detecting the face of a pet from an input image 41 illustrated in FIG. 5 will be described as the first example. FIG. 4 is a view illustrating one example of the detection process for detecting the pet from the input image 41 illustrated in FIG. 5. FIG. 5 is a view illustrating the input image 41 used in the first example.

In the first example, the detection target is the "face of the pet" such as the dog, cat, and the like, and the heterogeneous target is the "face of the person". The detection target region determination unit 25 determines that the region in which the estimated heterogeneous target is detected of the candidate regions is not the detection target region. Furthermore, a person 42 and a dog 43 are drawn in the input image 41, as illustrated in FIG. 5.

As illustrated in FIG. 4, the image acquisition unit 21 first acquires the input image 41 (S1). The detection target detection unit 22 executes the "face of the pet" detection, and detects the target assumed to be the face of the pet from the input image 41 (S2).

Figure 6:
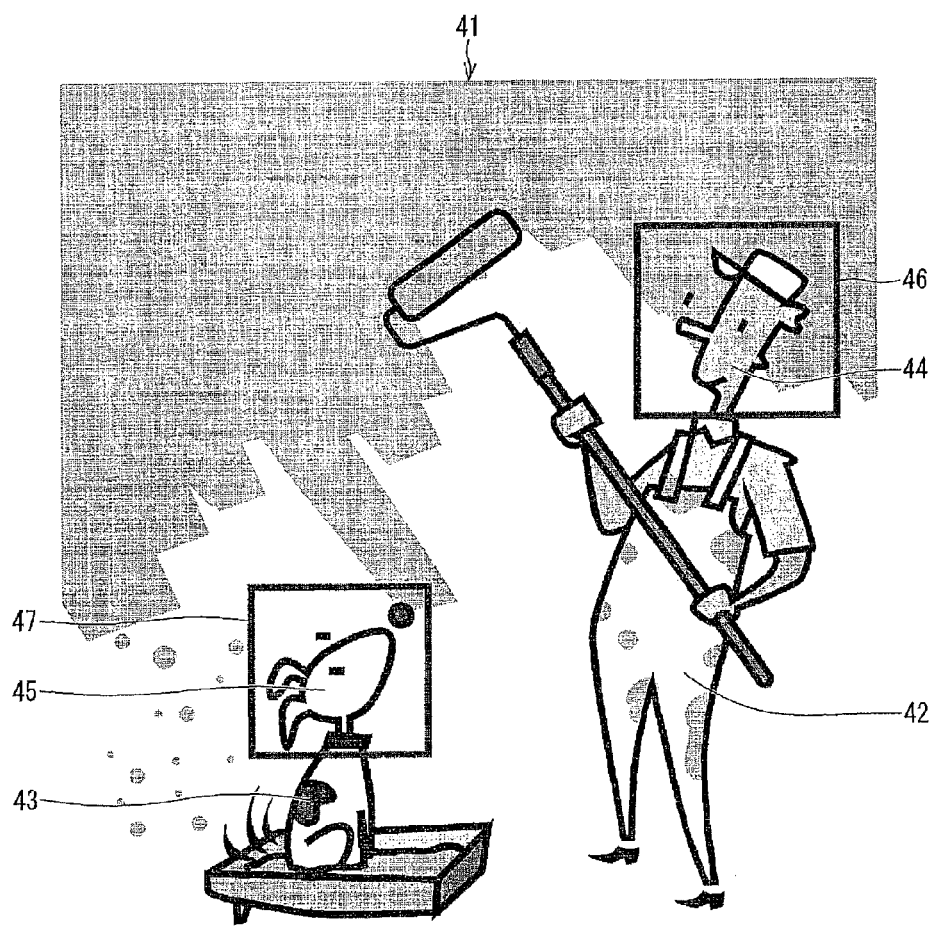
FIG. 6 is a view illustrating the result of executing the pet detection on the input image.

The candidate region identifying unit 23 determines whether or not the detection target detection unit 22 detected the estimated detection target (S3). Assume that the detection target detection unit 22 detected the face 45 of the dog and the face 44 of the person, as illustrated in FIG. 6.

Since the detection target detection unit 22 detected the face 45 of the dog and the face 44 of the person (YES in S3), the candidate region identifying unit 23 identifies a rectangular region 47 including the face 45 of the dog as the candidate region, and identifies a rectangular region 46 including the face 44 of the person as the candidate region (S4).

Figure 7:
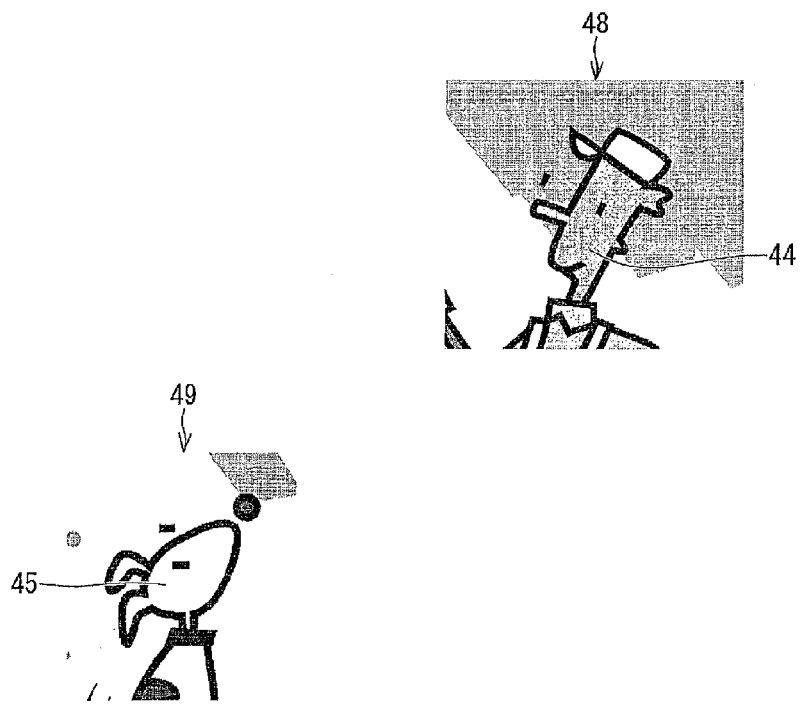
FIG. 7 is a view illustrating an image including a region detected by the pet detection.

As illustrated in FIG. 7, the heterogeneous target detection unit 24 cuts out the regions 48 and 49 including the candidate regions 46 and 47, respectively, from the input image 41, and executes the "face of the person" detection on the regions 48 and 49 (candidate regions 46 and 47) (S5).

Figure 8:
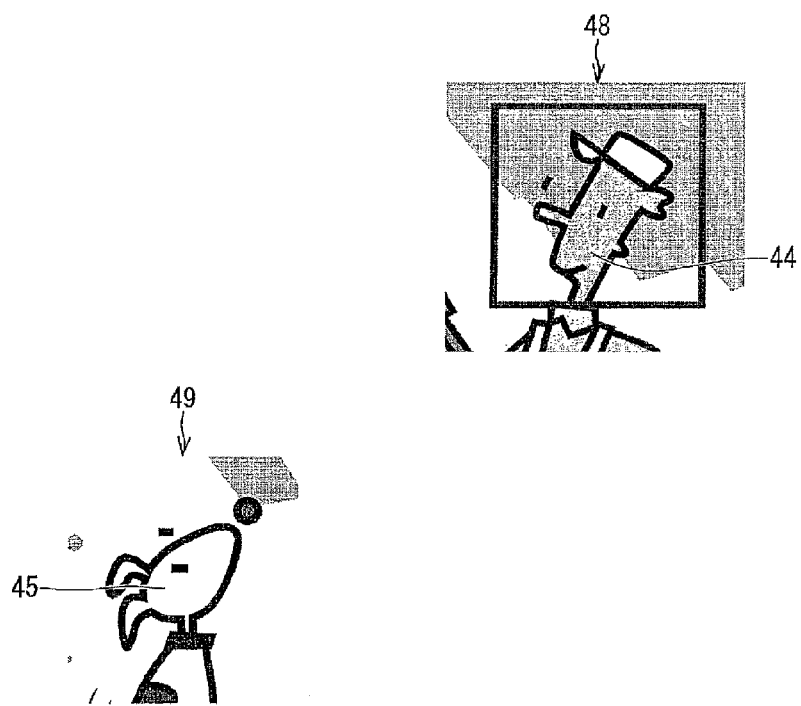
FIG. 8 is a view illustrating the result of executing a face detection of a person on the image including the region detected by the pet detection.

The detection target region determination unit 25 determines whether or not the "face of the person" is detected from the regions 48 and 49 (candidate regions 46 and 47) (S6). Assume that the heterogeneous target detection unit 24 detects the face 44 of the person from the region 48 (candidate region 46) and does not detect anything from the region 49 (candidate region 47), as illustrated in FIG. 8.

Since the heterogeneous target detection unit 24 detected that face 44 of the person, that is, the heterogeneous target from the region 48 (candidate region 46) (YES in S6), the detection target region determination unit 25 determines that the candidate region 46 is the removing region that is not the detection target region (S7). Furthermore, since the heterogeneous target detection unit 24 does not detect anything from the region 49 (candidate region 47) (NO in S6), the detection target region determination unit 25 determines that the candidate region 47 is the detection target region.

Figure 9:
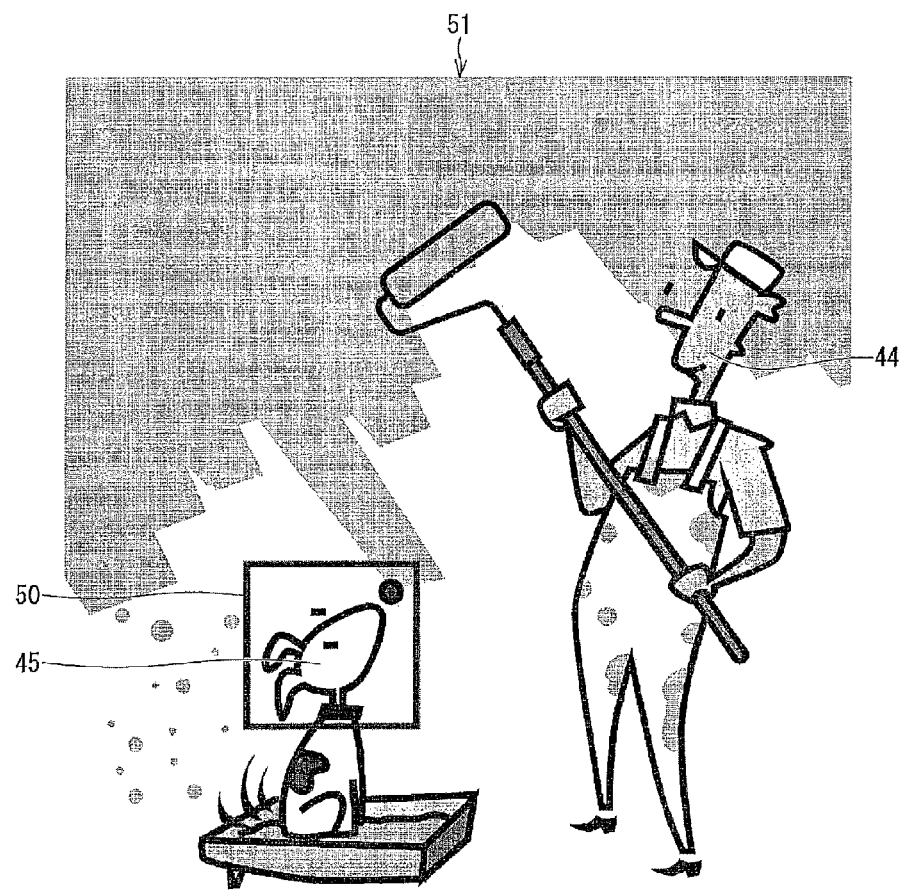
FIG. 9 is a view illustrating the result of the detection process.

The detection target region determination unit 25 removes the candidate region 46 determined as the removing region from the candidate regions 46 and 47, and identifies the remaining candidate region 47 as the detection target region (S8). As illustrated in FIG. 9, the detection target region output unit 26 draws the region (candidate region 47) including the face 45 of the dog on the input image 41 as the detection target region 50 and generates a detection result image 51, and displays the generated detection result image 51 on the display section 14 (S9).

If nothing is detected (NO in S3) as a result of the "face of the pet" detection executed by the detection target detection unit 22 in S2, the detection target region output unit 26 displays an image indicating that the "face of the pet" is not detected from the input image 41 on the display section 14 (S9). For example, the detection target region output unit 26 displays the input image 41 on the display section 14 as it is.

[Second Example]

Figure 10:
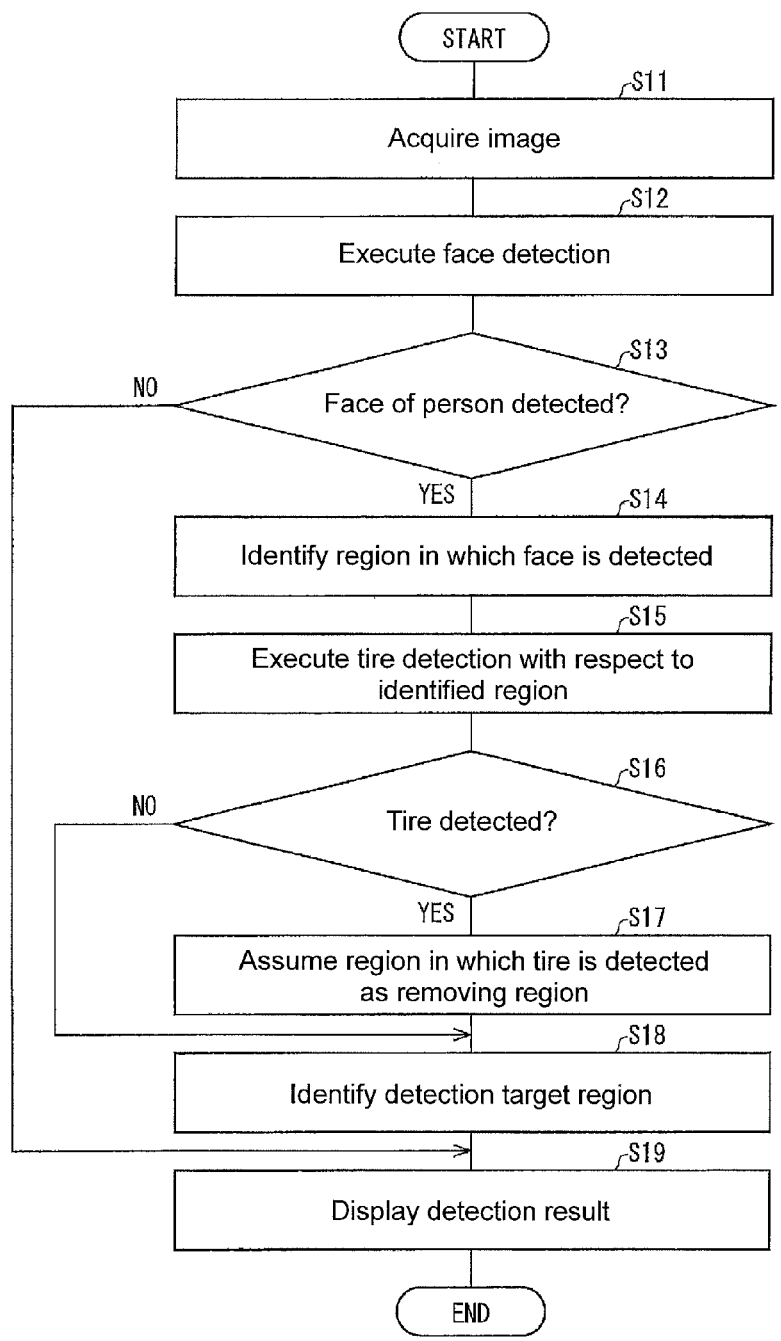
FIG. 10 is a view illustrating one example of a detection process for detecting a face of a person from the input image.
Figure 11:
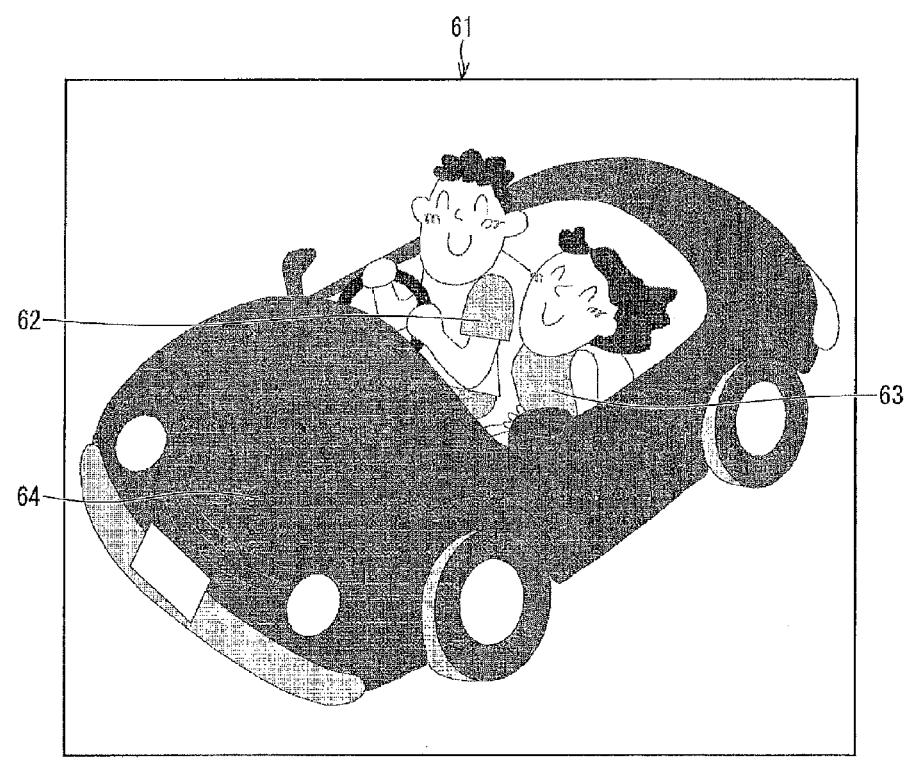
FIG. 11 is a view illustrating an input image used in the detection process.

The detection process example for detecting the face of the person from an input image 61 illustrated in FIG. 11 will now be described for the second example. FIG. 10 is a view illustrating an example of the detection process for detecting the face of the person from the input image 61 illustrated in FIG. 11. FIG. 11 is a view illustrating the input image 61 used in the second example.

In the second example, the detection target is the "face of the person", and the heterogeneous target is the "tire of the automobile". The detection target region determination unit 25 determines that the region in which the estimated heterogeneous target is detected of the candidate regions is not the detection target region. As illustrated in FIG. 11, people 62, 63 and an automobile 64 are drawn in the input image 61.

As illustrated in FIG. 10, the image acquisition unit 21 first acquires the input image 61 (S11). The detection target detection unit 22 executes the "face of the person" detection, and detects the target assumed to be the face of the person from the input image 61 (S12).

Figure 12:
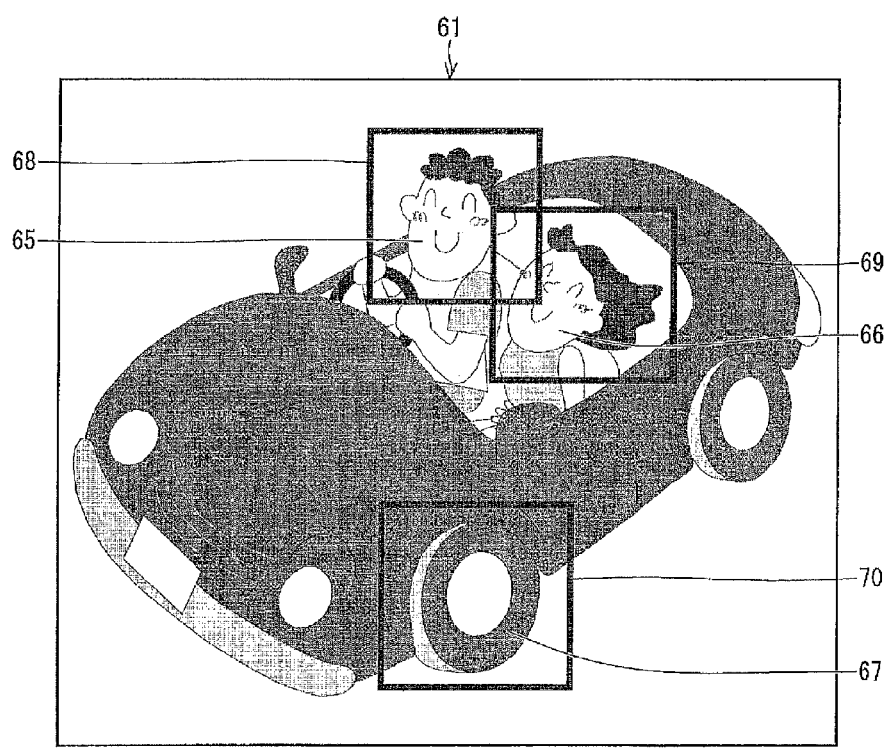
FIG. 12 is a view illustrating the result of executing the face detection of the person on the input image.

The candidate region identifying unit 23 determines whether or not the detection target detection unit 22 detected the estimated detection target (S13). Assume that the detection target detection unit 22 detected the faces 65, 66 of the people and the tire 67 of the automobile, as illustrated in FIG. 12.

Since the detection target detection unit 22 detected the faces 65, 66 of the people and the tire 67 of the automobile (YES in S13), the candidate region identifying unit 23 identifies a rectangular region 68 including the face 65 of the person as the candidate region, identifies a rectangular region 69 including the face 66 of the person as the candidate region, and identifies a rectangular region 70 including the tire 67 of the vehicle as the candidate region (S14).

Figure 13:
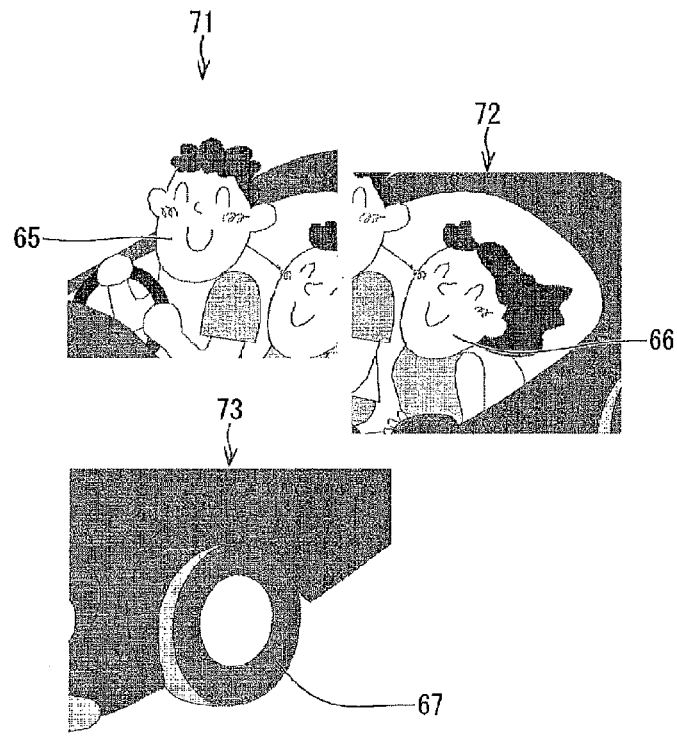
FIG. 13 is a view illustrating an image including a region detected by the face detection of the person.

As illustrated in FIG. 13, the heterogeneous target detection unit 24 cuts out the regions 71, 72, and 73 including the candidate regions 68, 69, and 70, respectively, from the input image 61, and executes the "tire of the automobile" detection on the regions 71, 72, and 73 (candidate regions 68, 69, and 70) (S15).

Figure 14:
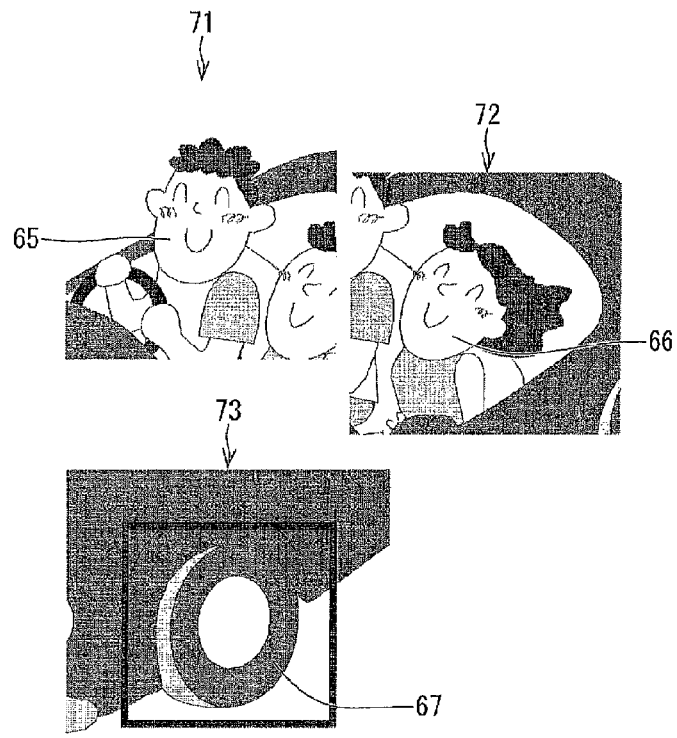
FIG. 14 is a view illustrating the result of executing tire detection of an automobile on the image including the region detected by the face detection of the person.

The detection target region determination unit 25 then determines whether or not the "tire of the automobile" is detected from the regions 71, 72, and 73 (candidate regions 68, 69, and 70) (S16). As illustrated in FIG. 14, the heterogeneous target detection unit 24 detects the tire 67 of the automobile from the region 73 (candidate region 70), and does not detect anything from the regions 71 and 72 (candidate regions 68 and 69).

Since the heterogeneous target detection unit 24 detected the tire 67 of the automobile, that is, the heterogeneous target from the region 73 (candidate region 70) (YES in S16), the detection target region determination unit 25 determines that the candidate region 70 is the removing region that is not the detection target region (S17). Furthermore, since the heterogeneous target detection unit 24 does not detect anything from the regions 71 and 72 (candidate regions 68 and 69) (NO in S16), the detection target region determination unit 25 determines that the candidate regions 68 and 69 are the detection target region.

Figure 15:
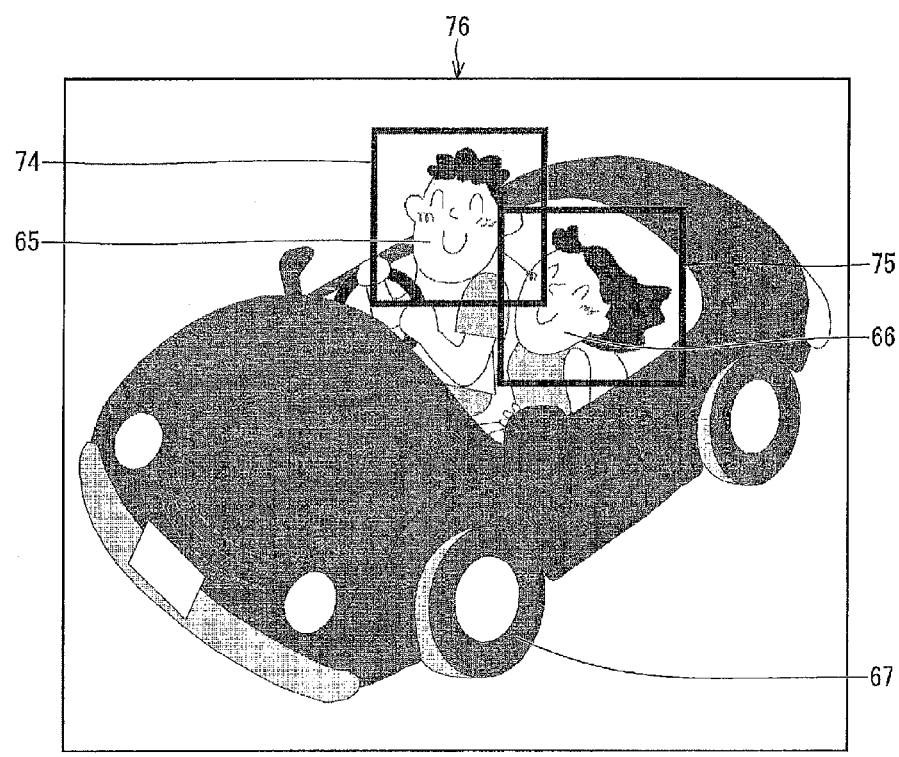
FIG. 15 is a view illustrating the result of the detection process.

The detection target region determination unit 25 removes the candidate region 70 determined as the removing region from the candidate regions 68 to 70, and identifies the remaining candidate regions 68 and 69 as the detection target regions (S18). As illustrated in FIG. 15, the detection target region output unit 26 draws the region (candidate regions 68 and 69) including the faces 65 an 66 of the person on the input image 61 as the detection target regions 74, 75 and generates a detection result image 76, and displays the generated detection result image 76 on the display section 14 (S19).

If nothing is detected (NO in S13) as a result of the "face of the person" detection executed by the detection target detection unit 22 in S12, the detection target region output unit 26 displays an image indicating that the "face of the person" is not detected from the input image 61 on the display section 14 (S19). For example, the detection target region output unit 26 displays the input image 61 on the display section 14 as it is.

[Third Example]

Figure 16:
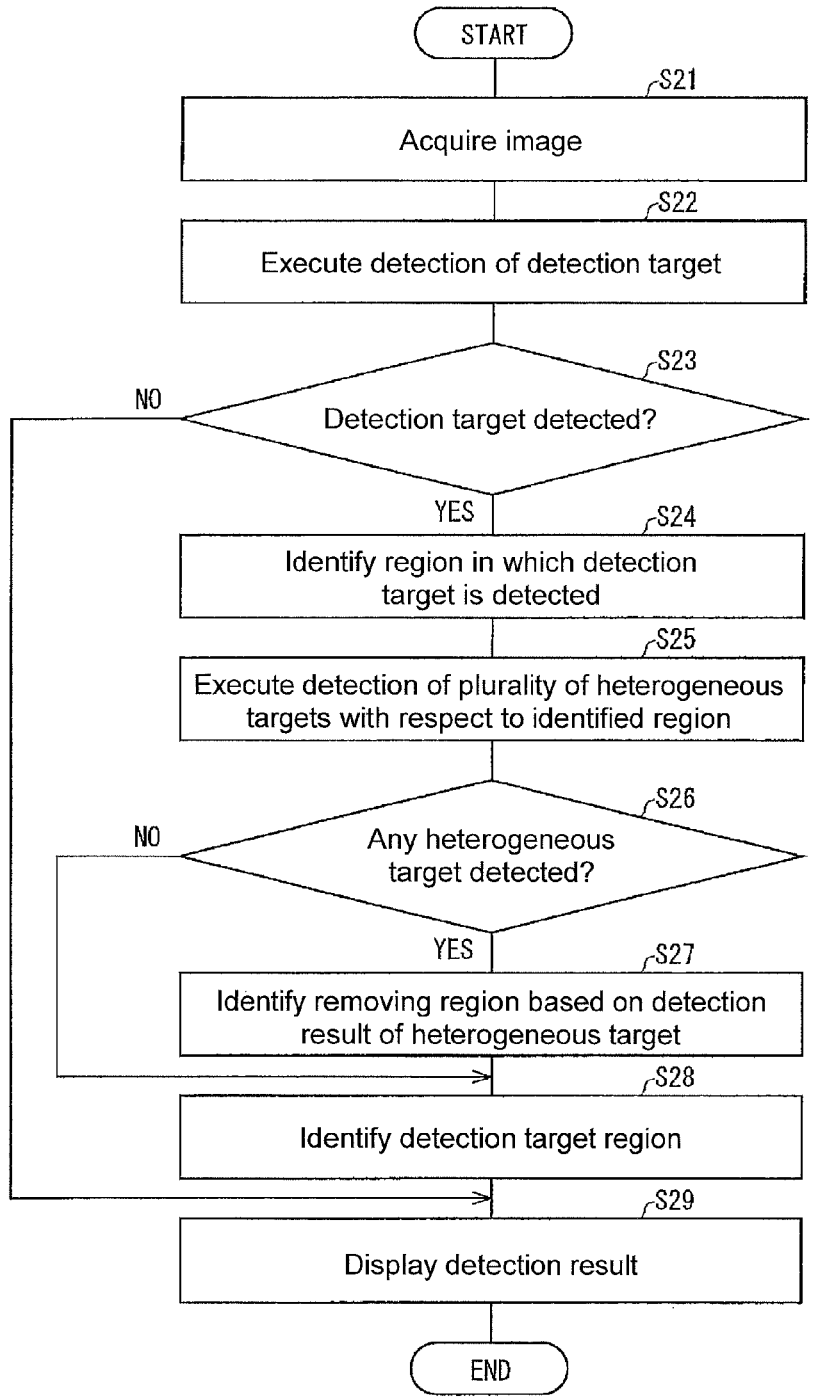
FIG. 16 is a view illustrating another example of the detection process for detecting the face of the person from the input image.

The detection process example for detecting the face of the person from the input image 41 illustrated in FIG. 5 will now be described for the third example. FIG. 16 is a view illustrating an example of the detection process for detecting the face of the person from the input image 41 illustrated in FIG. 5.

In the third example, the detection target is the "face of the person", and the heterogeneous target is the "face of the dog", the "face of the cat", and the "face of the bird". In other words, the number of classes of the estimated heterogeneous target is three in the third example. The detection target region determination unit 25 determines that the region in which two or more types of estimated heterogeneous targets are detected of the candidate regions is not the detection target region.

As illustrated in FIG. 16, the image acquisition unit 21 first acquires the input image 41 (S21). The detection target detection unit 22 then executes the "face of the person" detection (detection of detection target), and detects the target assumed to be the face of the person from the input image 41 (S22).

Figure 17:
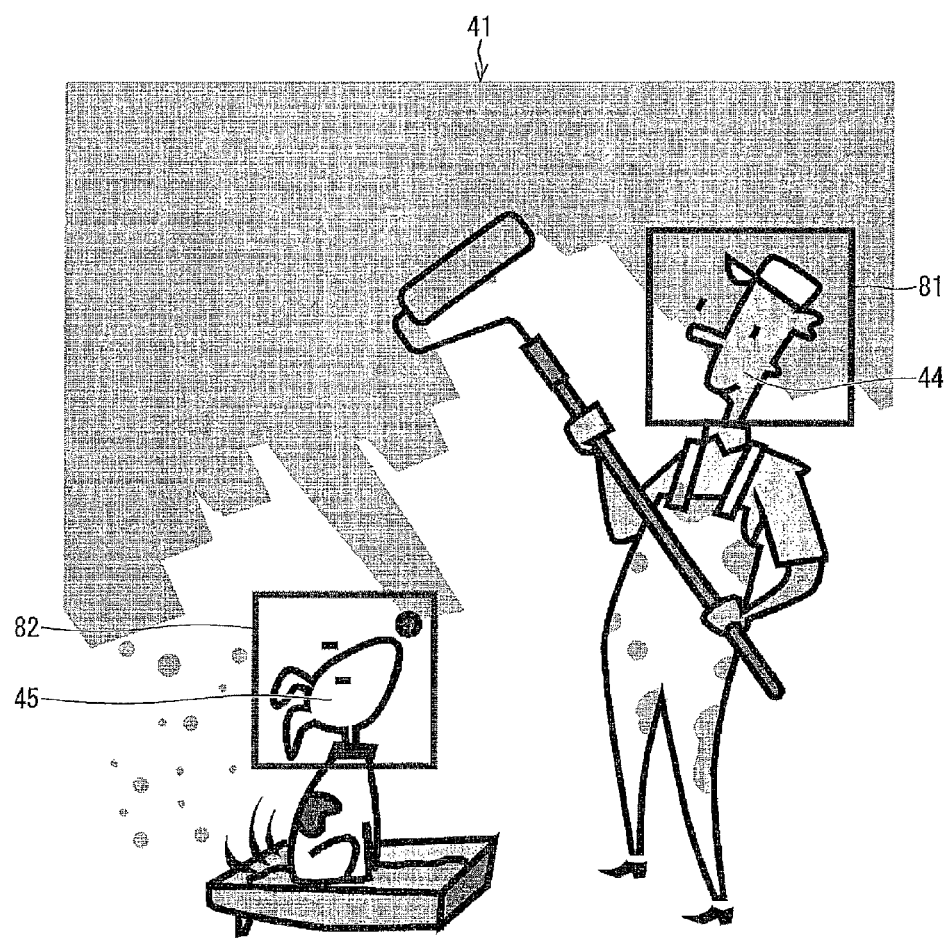
FIG. 17 is a view illustrating the result of executing the face detection of the person with respect to the input image.

The candidate region identifying unit 23 determines whether or not the detection target detection unit 22 detected the estimated detection target (S23). Assume that the detection target detection unit 22 detected the face 44 of the person and the face 45 of the dog, as illustrated in FIG. 17.

Since the detection target detection unit 22 detected the face 44 of the person and the face 45 of the dog (YES in S23), the candidate region identifying unit 23 identifies the rectangular region 81 including the face 44 of the person as the candidate region, and identifies the rectangular region 82 including the face 45 of the dog as the candidate region (S24).

Figures 18, 19:
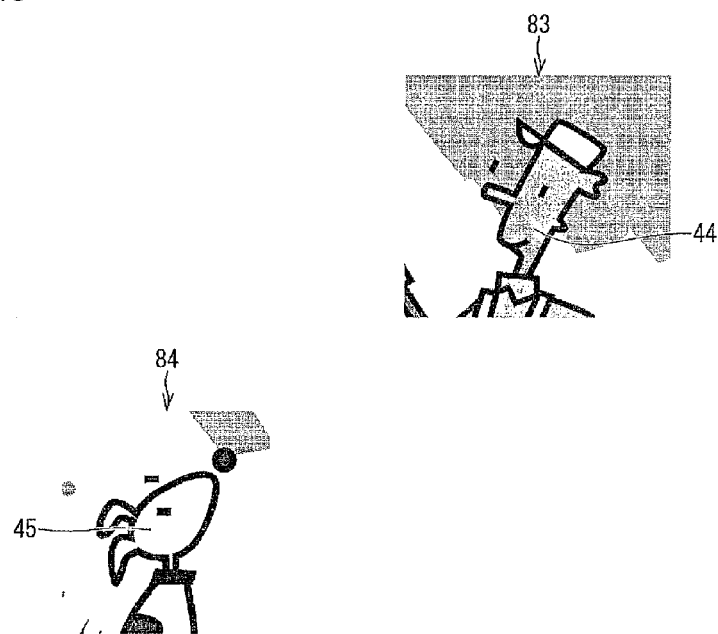
FIG. 18 is a view illustrating an image including the region detected by the face detection of the person.
FIG. 19 is a view illustrating the result of executing the face detection of the dog, the face detection of the cat, and the face detection of the bird with respect to the image including the region detected by the face detection of the person.

As illustrated in FIG. 18, the heterogeneous target detection unit 24 cuts out the regions 83 and 84 including the candidate regions 81 and 82, respectively, from the input image 41, and executes the "face of the dog" detection, the "face of the cat" detection, and the "face of the bird" detection (detection of a plurality of heterogeneous targets) on the regions 83 and 84 (candidate regions 81 and 82) (S25).

The detection target region determination unit 25 then determines whether or not the "face of the dog", the "face of the cat", and the "face of the bird" are respectively detected from the regions 83 and 84 (candidate regions 81 and 82) for every region (S26).

Assume that the heterogeneous target detection unit 24 detects the face 44 of the person as a result of executing the "face of the dog" detection on the region 83 (candidate region 81), but does not detect anything from the region 83 (candidate region 81) as a result of executing the "face of the cat" detection and the "face of the bird" detection, as illustrated in FIG. 19. Also assume that the heterogeneous target detection unit 24 detects the face 45 of the dog as a result of executing the "face of the dog" detection on the region 84 (candidate region 82), and detects the face 45 of the dog as a result of executing the "face of the cat" detection, but does not detect anything from the region 84 (candidate region 82) as a result of executing the "face of the bird" detection.

The face 45 of the same dog is detected by the "face of the dog" detection and the "face of the cat" detection from the region 84 (candidate region 82). However, since the "face of the dog" detection and the "face of the cat" detection detect different heterogeneous targets, two types of estimated heterogeneous targets are assumed to be detected from the region 84 (candidate region 82). That is, the number of "○" illustrated in FIG. 19 indicates the number of types of the estimated heterogeneous target detected from each region.

In S27, the detection target region determination unit 25 identifies the removing region based on the detection result of the heterogeneous target. In the case of the third example, the region in which two or more types of estimated heterogeneous targets are detected is determined as not the detection target region, that is, determined as the removing region, as described above.

In other words, since the heterogeneous target detection unit 24 detected one type of estimated heterogeneous target from the region 83 (candidate region 81) (YES in S26), the detection target region determination unit 25 determines that the candidate region 81 is the detection target region (S27). Since the heterogeneous target detection unit 24 detected two types of estimated heterogeneous targets from the region 84 (candidate region 82) (YES in S26), the detection target region determination unit 25 determines that the candidate region 82 is the removing region that is not the detection target region. If none of the estimated heterogeneous targets is detected from the region (NO in S26), the detection target region determination unit 25 determines that the relevant region is the detection target region (S27).

Figures 20, 21:
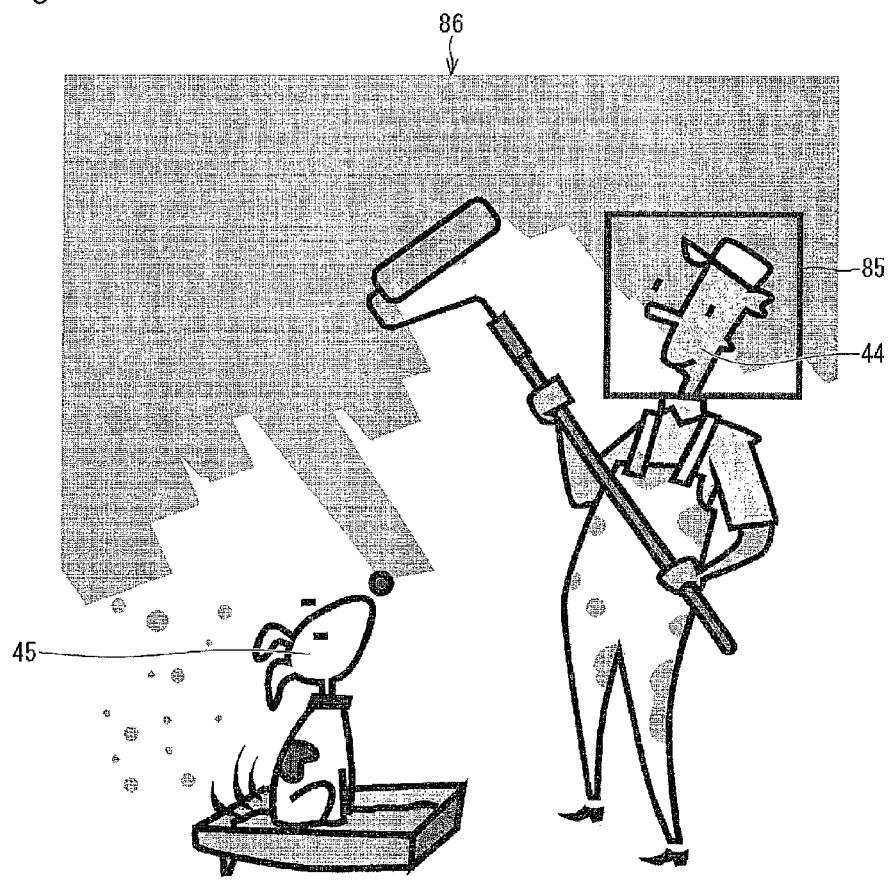
FIG. 20 is a view illustrating the result of the detection process.
FIG. 21 is a view illustrating the result of executing the face detection of the dog, the face detection of the cat, and the face detection of the bird with respect to the image including the region detected by the face detection of the person in the detection process for detecting the face of the person from the input image.

The detection target region determination unit 25 identifies the candidate region 81 as the detection target region (S28). As illustrated in FIG. 20, the detection target region output unit 26 draws the region (candidate region 81) including the face 44 of the person on the input image 41 as the detection target region 85 and generates a detection result image 86, and displays the generated detection result image 86 on the display section 14 (S29).

If nothing is detected (NO in S23) as a result of the detection target detection unit 22 executing the "face of the person" detection (detection of the detection target) in S22, the detection target region output unit 26 displays an image indicating that the "face of the person" is not detected from the input image 41 on the display section 14 (S29). For example, the detection target region output unit 26 displays the input image 41 on the display section 14 as it is.

[Fourth Example]

A determination process example for determining whether or not each candidate region is the detection target region based on the detection result of the heterogeneous target illustrated in FIG. 21 in the detection process for detecting the face of the person from a certain input image will now be described for a fourth example.

In the fourth example, the detection target is the "face of the person", and the heterogeneous target is the "face of the dog", the "face of the cat", and the "face of the bird", similarly to the third example.

Assume that the detection target detection unit 22 detected six targets assumed to be the face of the person from the input image, and the candidate region identifying unit 23 identified the candidate regions A to F including the six estimated detection targets. The heterogeneous target detection unit 24 executes the "face of the dog" detection, the "face of the cat" detection, and the "face of the bird" detection with respect to the candidate regions A to F, thus obtaining the result illustrated in FIG. 21.

Specifically, assume that three types of estimated heterogeneous targets by the "face of the dog" detection, the "face of the cat" detection, and the "face of the bird" detection are detected from the candidate region A, one type of estimated heterogeneous target by the "face of the dog" detection is detected from the candidate region B, two types of estimated heterogeneous targets by the "face of the dog" detection and the "face of the cat" detection are detected from the candidate region C, two types of estimated heterogeneous targets by the "face of the cat" detection and the "face of the bird" detection are detected from the candidate region D, no estimated heterogeneous target is detected from the candidate region E, and one type of estimated heterogeneous target by the "face of the cat" detection is detected from the candidate region F.

In the fourth example, three cases will be described when the detection target region determination unit 25 determines that the candidate region in which one of the estimated heterogeneous targets is detected is not the detection target region, when the detection target region determination unit 25 determines that the candidate region in which a predetermined estimated heterogeneous target is detected is not the detection target region, and when the detection target region determination unit 25 determines the candidate region in which a predetermined estimated heterogeneous target is detected and the candidate region in which the estimated heterogeneous target of a predetermined number of classes is detected is not the detection target region.

First, a case in which the detection target region determination unit 25 determines that the candidate region in which one of the estimated heterogeneous targets is detected is not the detection target region will be described. In this case, with reference to the result of FIG. 21, the candidate region in which one of the estimated heterogeneous targets is detected is the candidate regions A to D, F, and thus the detection target region determination unit 25 determines that the candidate regions A to D, F are not the detection target region. Since no estimated heterogeneous target is detected in the candidate region E, the detection target region determination unit 25 determines that the candidate region E is the detection target region.

Next, a case in which the detection target region determination unit 25 determines that the candidate region in which a predetermined estimated heterogeneous target is detected is not the detection target region will be described. For example, the detection target region determination unit 25 determines that the candidate region in which the estimated heterogeneous target is detected by the "face of the dog" detection is not the detection target region.

In this case, with reference to the result of FIG. 21, the candidate region in which the estimated heterogeneous target is detected by the "face of the dog" detection is the candidate regions A to C, and thus the detection target region determination unit 25 determines that the candidate regions A to C are not the detection target region. Since the estimated heterogeneous target is not detected by the "face of the dog" detection in the candidate regions D to F, the detection target region determination unit 25 determines that the candidate regions D to F are the detection target regions.

Lastly, a case in which the detection target region determination unit 25 determines that the candidate region in which a predetermined estimated heterogeneous target is detected and a candidate region in which the estimated heterogeneous target of a predetermined number of classes is detected are not the detection target region will be described. For example, the detection target region determination unit 25 determines that the candidate region in which the estimated heterogeneous target is detected by the "face of the dog" detection is not the detection target region, and also determines that the candidate region in which two or more types of estimated heterogeneous targets are detected is not the detection target region. In other words, when the estimated heterogeneous target is detected by the "face of the dog" detection from the candidate region, or not detected with the "face of the dog" detection from the candidate region, but two types of estimated heterogeneous targets are detected by the "face of the cat" detection and the "face of the bird" detection, the detection target region determination unit 25 determines that the candidate region is not the detection target region.

In this case, with reference to the result of FIG. 21, the candidate region in which the estimated heterogeneous target is detected by the "face of the dog" detection is the candidate regions A to C, and thus the detection target region determination unit 25 determines that the candidate regions A to C are not the detection target region. The candidate region in which two types of estimated heterogeneous targets are detected by the "face of the cat" detection and the "face of the bird" detection among the candidate regions D to F not detected by the "face of the dog" detection is the candidate region D, and thus the detection target region determination unit 25 determines that the candidate region D is not the detection target region. The detection target region determination unit 25 determines the remaining candidate regions E, F not corresponding to the above are the detection target region.

[Fifth Example]

Lastly, a determination process example for determining whether or not each candidate region is the detection target region based on the heterogeneous target certainty degree, or the heterogeneous target certainty degree and the detection target certainty degree in the detection process for detecting the face of the person from a certain input image will be described for a fifth example.

In the fifth example, the detection target is the "face of the person", and the heterogeneous target is the "face of the dog", the "face of the cat", and the "face of the bird", similarly to the third example.

Assume that the detection target detection unit 22 detected three targets assumed to be the face of the person from the input image, and the candidate region identifying unit 23 identified the candidate regions G to I including the three estimated detection targets. The heterogeneous target detection unit 24 executes the "face of the dog" detection, the "face of the cat" detection, and the "face of the bird" detection with respect to the candidate regions G to I, and furthermore, the heterogeneous target detection unit 24 specifies the heterogeneous target certainty degree of the detected estimated heterogeneous target, thus obtaining the result illustrated in FIG. 22.

Specifically, the three types of estimated heterogeneous targets by the "face of the dog" detection, the "face of the cat" detection, and the "face of the bird" detection are detected from the candidate G, and the respective heterogeneous target certainty degrees are assumed to be 300, 300, 400. The three types of estimated heterogeneous target by the "face of the dog" detection, the "face of the cat" detection, and the "face of the bird" detection are detected from the candidate H, and the respective heterogeneous target certainty degrees are assumed to be 200, 200, 200. The two types of estimated heterogeneous targets by the "face of the dog" detection and the "face of the cat" detection are detected from the candidate I, and the respective heterogeneous target certainty degrees are assumed to be 400, 400.

In the fifth example, two cases in which the detection target region determination unit 25 determines whether or not the candidate region is the target detection region based on the heterogeneous target certainty degree, and in which the detection target region determination unit 25 determines whether or not the candidate region is the detection target region based on the heterogeneous target certainty degree and the detection target certainty degree will be described.

First, a case in which the detection target region determination unit 25 determines whether or not the candidate region is the detection target region based on the heterogeneous target certainty degree will be described. For example, if the total value of the heterogeneous target certainty degrees of the estimated heterogeneous targets that are detected is greater than 700, determination is made that the candidate region is not the detection target region.

In this case, with reference to the result of FIG. 22, the total value of the heterogeneous target certainty degrees of the estimated heterogeneous targets is 300+300+400= 1000 (>700) in the candidate region G, and thus the detection target region determination unit 25 determines that the candidate region G is not the detection target region. Furthermore, the total value of the heterogeneous target certainty degrees of the estimated heterogeneous targets is 200+200+ 200=600 (<700) in the candidate region H, and thus the detection target region determination unit 25 determines that the candidate region H is the detection target region. Furthermore, the total value of the heterogeneous target certainty degrees of the estimated heterogeneous targets is 400+400=800 (>700) in the candidate region I, and thus the detection target region determination unit 25 determines that the candidate region I is not the detection target region.

Next, a case in which the detection target region determination unit 25 determines whether or not the candidate region is the detection target region based on the heterogeneous target certainty degree and the detection target certainty degree will be described. Assuming that the detection target certainty degrees of the estimated detection targets in the candidate regions G to I are all 900, if the total value of the heterogeneous target certainty degrees of the estimated heterogeneous targets that are detected is greater than the detection target certainty degree (900), determination is made that the candidate region is not the detection target region.

In this case, with reference to the result of FIG. 22, the total value of the heterogeneous target certainty degrees of the estimated heterogeneous targets is 300+300+400= 1000 (>900) in the candidate region G, and thus the detection target region determination unit 25 determines that the candidate region G is not the detection target region. Furthermore, the total value of the heterogeneous target certainty degrees of the estimated heterogeneous targets is 200+200+ 200=600 (<900) in the candidate region H, and thus the detection target region determination unit 25 determines that the candidate region H is the detection target region. Furthermore, the total value of the heterogeneous target certainty degrees of the estimated heterogeneous targets is 400+400=800 (<900) in the candidate region I, and thus the detection target region determination unit 25 determines that the candidate region I is the detection target region.

In this case, the detection target region determination unit 25 compares the magnitude relationship of the total value of the heterogeneous target certainty degrees of the estimated heterogeneous targets and the detection target certainty degree to determine whether or not the candidate region is the detection target region, but this is not the sole case, and how to use the heterogeneous target certainty degrees of a plurality of estimated heterogeneous targets and the detection target certainty degree may be arbitrary. In other words, the detection target region determination unit 25 merely needs to be able to determine whether or not the candidate region is the detection target region based on the heterogeneous target certainty degrees of the plurality of estimated heterogeneous targets and the detection target certainty degree.

Furthermore, in the two cases described above, the detection target region determination unit 25 may calculate the total value of the heterogeneous target certainty degrees using the weighting information 32 illustrated in FIG. 3.

Specifically, when the detection target region determination unit 25 makes the determination based on only the heterogeneous target certainty degree, the total value of the heterogeneous target certainty degrees with respect to the candidate region G becomes 300×0.8+300×0.8+400×1.4=1040. Since the total value is greater than the threshold value 700, the detection target region determination unit 25 determines that the candidate region G is not the detection target region. Furthermore, the total value of the heterogeneous target certainty degrees with respect to the candidate region H becomes 200×0.8+200× 0.8+200×1.4=600. Since the total value is smaller than the threshold value 700, the detection target region determination unit 25 determines that the candidate region G is the detection target region. Furthermore, the total value of the heterogeneous target certainty degrees with respect to the candidate region I becomes 400×0.8+400×0.8=640. Since the total value is smaller than the threshold value 700, the detection target region determination unit 25 determines that the candidate region G is the detection target region.

When the detection target region determination unit 25 makes the determination based on the heterogeneous target certainty degree and the detection target certainty degree, the total value of the heterogeneous target certainty degrees with respect to the candidate region G similarly becomes 300×0.8+300×0.8+400×1.4=1040. Since the total value is greater than the detection target certainty degree 900, the detection target region determination unit 25 determines that the candidate region G is not the detection target region. Furthermore, the total value of the heterogeneous target certainty degrees with respect to the candidate region H becomes 200×0.8+200×0.8+200×1.4=600. Since the total value is smaller than detection target certainty degree 900, the detection target region determination unit 25 determines that the candidate region G is the detection target region. Furthermore, the total value of the heterogeneous target certainty degrees with respect to the candidate region I becomes 400×0.8+400×0.8=640. Since the total value is smaller than detection target certainty degree 900, the detection target region determination unit 25 determines that the candidate region G is the detection target region.

[First Variant]

An example in which the heterogeneous target detection unit 24 determines the content and/or number of classes of the detection class based on the detection target certainty degree will be described for a first variant.

In the first variant, assume that the detection target is the "face of the person", the detection target detection unit 22 detected four targets assumed to be the face of the person from the input image, and the candidate region identifying unit 23 identified the candidate regions J to M including the four estimated detection targets. The detection target certainty degrees of the estimated detection targets included in the candidate regions J to M are assumed to be 1200, 900, 700, 500, respectively. The heterogeneous target detection unit 24 reads out the detection class information 31 illustrated in FIG. 2 from the storage section 12, and determines the content and the number of classes of the detection class based on the detection class information 31.

In this case, the heterogeneous target detection unit 24 selects pattern 1 indicated in the detection class information 31 since the detection target certainty degree of the estimated detection target included in the candidate region J is 1200. Specifically, the heterogeneous target detection unit 24 does not execute the detection of any heterogeneous target with respect to the candidate region J. The heterogeneous target detection unit 24 selects pattern 2 indicated in the detection class information 31 since the detection target certainty degree of the estimated detection target included in the candidate region K is 900. Specifically, the heterogeneous target detection unit 24 executes only the "face of the dog" detection with respect to the candidate region K. The heterogeneous target detection unit 24 selects pattern 3 indicated in the detection class information 31 since the detection target certainty degree of the estimated detection target included in the candidate region L is 700. Specifically, the heterogeneous target detection unit 24 executes the "face of the dog" detection and the "face of the cat" detection with respect to the candidate region L. The heterogeneous target detection unit 24 selects pattern 4 indicated in the detection class information 31 since the detection target certainty degree of the estimated detection target included in the candidate region M is 500. Specifically, the heterogeneous target detection unit 24 executes the "face of the dog" detection, the "face of the cat" detection, and the "face of the bird" detection with respect to the candidate region M.

[Second Variant]

Above, the heterogeneous target, which is the target to be detected by the heterogeneous target detection unit 24, is the target assumed to be all or a part of the main body that differs in class from the main body of the detection target, but this is not the sole case. For example, the heterogeneous target may be a target different in class from the detection target.

In this case, for example, if the detection target is the "eye of the person", the heterogeneous target may be the "mouth of the person", and the like. Furthermore, if the detection target is the "hand of the person", the heterogeneous target may be the "face of the person", the "foot of the person", and the like.

An image processing device according to one or more embodiments of the present invention is an image processing device configured to detect a detection target, which is all or a part of a predetermined main body on an image, the image processing device including a detection target detection unit configured to detect an estimated detection target assumed to be the detection target from the image; a heterogeneous target determination unit configured to determine whether or not an estimated detection target detected by the detection target detection unit is an estimated heterogeneous target assumed to be a heterogeneous target, which is all or a part of a main body different in class from the main body; and a detection target determination unit configured to determine whether or not the estimated detection target detected by the detection target detection unit is the detection target based on a determination result of the heterogeneous target determination unit.

An image processing method according to one or more embodiments of the present invention is an image processing method configured to detect a detection target, which is all or a part of a predetermined main body on an image; the image processing method including the steps of detecting an estimated detection target assumed to be the detection target from the image; determining whether or not the estimated detection target detected in the detection target detecting step is an estimated heterogeneous target assumed to be a heterogeneous target, which is all or a part of a main body different in class from the main body; and determining whether or not the estimated detection target detected in the detection target detecting step is the detection target based on a determination result of the heterogeneous target determining step.

Generally, the detection target detection unit configured to detect a predetermined detection target has a possibility of detecting not only a desired detection target, but also a target different from the desired detection target as an estimated detection target. The detection accuracy can be enhanced by reducing the false detection of the detection target detection unit.

The image processing device and the image processing method according to one or more embodiments of the present invention, on the other hand, determine whether or not the estimated detection target detected by the detection target detection unit is the estimated heterogeneous target assumed to be the heterogeneous target, and determine whether or not the estimated detection target is the detection target based on the determination result.

If the estimated detection target is determined as the estimated heterogeneous target, the estimated detection target has a high possibility of being not the detection target but the heterogeneous target. If the estimated detection target is determined as not the estimated heterogeneous target, the estimated detection target has a high possibility of being not the heterogeneous target but the detection target.

Thus, for example, the estimated detection target is determined as not the detection target if the estimated detection target is determined as the estimated heterogeneous target, and the estimated detection target is determined as the detection target if the estimated detection target is determined as not the estimated heterogeneous target, so that the false detection can be effectively and efficiently reduced compared to the prior art. Therefore, an effect of effectively and efficiently enhancing the detection accuracy is obtained.

A target having a high possibility of false detection may exist according to the detection target. In this case, the target having a high possibility of false detection is set as the heterogeneous target, so that the false detection can be more efficiently reduced, and furthermore, the detection accuracy can be enhanced.

According to the image processing device of one or more embodiments of the present invention, the heterogeneous target determination unit determines whether or not the estimated detection target detected by the detection target detection unit is an estimated heterogeneous target for every class with respect to the estimated heterogeneous target of a plurality of classes.

For example, when determining one type of estimated heterogeneous target, there is a case in which the estimated detection target is not determined as the estimated heterogeneous target and the estimated detection target is determined as the detection target although the estimated detection target is actually not the detection target. On the contrary, there is a case in which the estimated detection target is determined as the estimated heterogeneous target, and the estimated detection target is not determined as the detection target although the estimated detection target is actually the detection target.

Thus, the heterogeneous target determination unit determines whether or not the estimated detection target is the estimated heterogeneous target for every class with respect to the estimated heterogeneous targets of a plurality of classes, and determines whether or not the estimated detection target is the detection target based on the plurality of detection results, so that the accuracy of excluding the false detection can be enhanced.

According to the image processing device of one or more embodiments of the present invention, the detection target detection unit detects the estimated detection target and specifies a detection target certainty degree indicating a certainty degree of the estimated detection target being the detection target; and the heterogeneous target determination unit determines a content of class and/or number of classes of the estimated heterogeneous target to determine based on the detection target certainty degree of the estimated detection target detected by the detection target detection unit.

The estimated detection target having a high detection target certainty degree has a high possibility of being the detection target, and the estimated detection target having a low detection target certainty degree has a low possibility of being the detection target. For example, the false detection can be adequately prevented with respect to the estimated detection target having a high detection target certainty degree even by limiting the content of class of the estimated heterogeneous target to determine or by reducing the number of classes. Furthermore, the false detection can be effectively prevented with respect to the estimated detection target having a low detection target certainty degree even by extending the content of class of the estimated heterogeneous target to determine or by increasing the number of classes.

Thus, the false detection can be efficiently reduced by having the heterogeneous target determination unit determine the content of class and/or number of classes of the estimated heterogeneous target to determine based on the detection target certainty degree.

According to the image processing device of one or more embodiments of the present invention, the detection target determination unit determines that the estimated detection target is not the detection target when the heterogeneous target determination unit determines that the estimated detection target is the estimated heterogeneous target.

According to the configuration described above, the detection target determination unit determines that the estimated detection target is not the detection target when the heterogeneous target determination unit determines that the estimated detection target is the estimated heterogeneous target. As described above, if the estimated detection target is determined as the estimated heterogeneous target, there is a case in which the estimated detection target is not the detection target but the heterogeneous target. Thus, the false detection can be reduced by determining that the estimated detection target determined to be the estimated heterogeneous target is not the detection target.

According to the image processing device of one or more embodiments of the present invention, the detection target determination unit determines that the estimated detection target is not the detection target when the heterogeneous target determination unit determines that the estimated detection target is an estimated heterogeneous target of a predetermined class.

For example, there is a case in which the determination accuracy of the estimated heterogeneous target of a predetermined class is high, a case in which the possibility that the heterogeneous target corresponding to the estimated heterogeneous target of a predetermined class is falsely detected is high when detecting the detection target, and the like. In other words, in this case, the estimated detection target determined to be the estimated heterogeneous target of a predetermined class has a high possibility of being not the detection target but the heterogeneous target. Thus, the false detection can be efficiently and effectively reduced by determining that the estimated detection target determined to be the estimated heterogeneous target of a predetermined class is not the detection target.

According to the image processing device of one or more embodiments of the present invention, the detection target determination unit determines that the estimated detection target is not the detection target when the heterogeneous target determination unit determines that the estimated detection target is the estimated heterogeneous target for an estimated heterogeneous target of a predetermined number of classes.

The estimated detection target determined to be the estimated heterogeneous target may not actually be the detection target but may be the detection target. However, the estimated detection target determined to be the estimated heterogeneous target for a plurality of classes has a high possibility of being the heterogeneous target.

Thus, the false detection can be effectively reduced by determining that the estimated detection target determined to be the estimated heterogeneous target is not the detection target for the estimated heterogeneous targets of a predetermined number of classes.

According to one or more embodiments of the present invention, the heterogeneous target determination unit specifies a heterogeneous target certainty degree indicating a certainty degree of the estimated heterogeneous target being a corresponding heterogeneous target for every estimated heterogeneous target when determined that the estimated detection target is the estimated heterogeneous target; and the detection target determination unit determines that the estimated detection target is not the detection target when a total value, which is obtained by totaling the heterogeneous target certainty degrees of the estimated heterogeneous targets, is greater than or equal to a predetermined threshold value.

The estimated detection target having a high heterogeneous target certainty degree or a total value thereof has a high possibility of being the heterogeneous target, and the estimated detection target having a low heterogeneous target certainty degree or a total value thereof has a low possibility of being the heterogeneous target.

Thus, the false detection can be effectively reduced by determining that the estimated detection target in which the total value of the heterogeneous target certainty degrees is greater than or equal to a predetermined value is not the detection target.

According to one or more embodiments of the present invention, the detection target detection unit detects the estimated detection target and specifies a detection target certainty degree indicating a certainty degree of the estimated detection target being the detection target; the heterogeneous target determination unit specifies a heterogeneous target certainty degree indicating a certainty degree of the estimated heterogeneous target being the corresponding heterogeneous target for every estimated heterogeneous target when determined that the estimated detection target is the estimated heterogeneous target; and the detection target determination unit determines whether or not the estimated detection target is the detection target based on the heterogeneous target certainty degree of each estimated heterogeneous target and the detection target certainty degree.

The estimated detection target having a high detection target certainty degree and low heterogeneous target certainty degree or total value thereof has a high possibility of being the detection target. The estimated detection target having a low detection target certainty degree and high heterogeneous target certainty degree or total value thereof has a low possibility of being the detection target.

Thus, the false detection can be effectively reduced by determining whether or not the estimated detection target is the detection target based on the heterogeneous target certainty degrees of a plurality of estimated heterogeneous targets and the detection target certainty degree.

The detection target determination unit according to one or more embodiments of the present invention multiplies a predetermined weighting value defined in advance for every estimated heterogeneous target to each heterogeneous target certainty degree of each estimated heterogeneous target, and determines whether or not the estimated detection target is the detection target based on a plurality of heterogeneous target certainty degrees after the multiplication.

For example, the value of the heterogeneous target certainty degree can more accurately reflect whether or not the estimated detection target is the detection target by setting a high weighting value to the estimated heterogeneous target having a high determination accuracy or the estimated heterogeneous target having a high possibility of false detection, and setting a low weighting value to the estimated heterogeneous target having a low determination accuracy or the estimated heterogeneous target having a low possibility of false detection.

Since the detection target determination unit multiplies a predetermined weighting value defined in advance for every estimated heterogeneous target to each heterogeneous target certainty degree of each estimated heterogeneous target, and determines whether or not the estimated detection target is the detection target based on a plurality of heterogeneous target certainty degrees after the multiplication, the false detection can be effectively reduced.

The image processing device may be realized with a computer, in which case, by operating the computer as each section of the image processing device, a control program for realizing the image processing device with the computer and a computer-readable recording medium recorded with such a program are also encompassed within the scope of the present invention.

[Supplement]

The present invention is not limited to the embodiments described above, and various changes can be made within a scope defined by the claims. In other words, embodiments obtained by combining technical means appropriately changed within the scope defined by the claims are also encompassed within the technical scope of the present invention.

Lastly, each block of the image processing device 1, in particular, the control section 11 may be configured by a hardware logic, or may be realized by software using the CPU in the following manner.

In other words, the image processing device 1 includes a CPU (Central Processing Unit) for executing a command of the control program for realizing each function, a ROM (Read Only Memory) stored with the program, a RAM (Random Access Memory) for developing the program, a storage device (recording medium) such as a memory for storing the program and the various types of data and the like. According to one or more embodiments of the present invention, a recording medium computer is readably recorded with a program code (executable format program, intermediate code program, source program) of the control program of the image processing device 1, which is a software for realizing the functions described above, to the image processing device 1, and causing the computer (or CPU or MPU) to read out and execute the program code recorded on the recoding medium.

The recording medium may be, for example, a tape series such as a magnetic tape and a cassette tape, a disc series such as a magnetic disc including a floppy (registered trademark) disc/hard disc and an optical disc including a CD-ROM/MO/MD/DVD/CD-R, a card series such as an IC card (include a memory card)/optical card, a semiconductor memory series such as a mask ROM/EPROM/EEPROM/flash ROM, and the like.

The image processing device 1 may be configured to be connectable with the communication network, and the program code may be provided through the communication network. The communication network is not particularly limited, and for example, Internet, Intranet, Extranet, LAN, ISDN, VAN, CATV communication network, virtual private network, telephone line network, mobile communication network, satellite communication network, and the like can be used. A transmission medium configuring the communication network is not particularly limited, and for example, wired line such as IEEE 1394, USB, power line carrier, cable TV line, telephone line, ADSL line, and the like, infrared light such as IrDA and remote controller, or wireless line such as Bluetooth (registered trademark), 802.11 wireless, HDR, portable telephone line, satellite line, terrestrial digital network, and the like can be used. One or more embodiments of the present invention can also be realized with a mode of a computer data signal embedded in a carrier wave in which the program code is embodied with electronic transmission.

One or more embodiments of the present invention can be used for the image processing device for detecting a predetermined material object on an image.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

1 image processing device
22 detection target detection unit (detection target detection unit)
24 heterogeneous target detection unit (heterogeneous target determination unit)
25 detection target region determination unit (detection target determination unit)

The invention claimed is:

1. An image processing device configured to detect a detection target, which is all or a part of a predetermined main body on an image, comprising:
   a detection target detection unit that detects an estimated detection target that the image processing device assumes to be the detection target from the image;
   a heterogeneous target determination unit that determines whether the estimated detection target detected by the detection target detection unit is an estimated heterogeneous target that the image processing device assumes to be a heterogeneous target, which is all or a part of a main body different in class from the main body; and
   a detection target determination unit that determines whether the estimated detection target detected by the detection target detection unit is the detection target based on a determination result of the heterogeneous target determination unit.

2. The image processing device according to claim 1, wherein the heterogeneous target determination unit determines whether the estimated detection target detected by the detection target detection unit is an estimated heterogeneous target for every class with respect to the estimated heterogeneous target of a plurality of classes.

3. The image processing device according to claim 2, wherein the detection target determination unit determines that the estimated detection target is not the detection target when the heterogeneous target determination unit determines that the estimated detection target is an estimated heterogeneous target of a predetermined class.

4. The image processing device according to claim 3, wherein the detection target determination unit determines that the estimated detection target is not the detection target when the heterogeneous target determination unit determines that the estimated detection target is the estimated heterogeneous target for an estimated heterogeneous target of a predetermined number of classes.

5. The image processing device according to claim 2, wherein the detection target determination unit determines that the estimated detection target is not the detection target when the heterogeneous target determination unit determines that the estimated detection target is the estimated heterogeneous target for an estimated heterogeneous target of a predetermined number of classes.

6. The image processing device according to claim 2, wherein the detection target determination unit determines that the estimated detection target is not the detection target when the heterogeneous target determination unit determines that the estimated detection target is the estimated heterogeneous target.

7. The image processing device according to claim 2,
   wherein the heterogeneous target determination unit specifies a heterogeneous target certainty degree indicating a certainty degree of the estimated heterogeneous target being a corresponding heterogeneous target for every estimated heterogeneous target when determined that the estimated detection target is the estimated heterogeneous target, and
   wherein the detection target determination unit determines that the estimated detection target is not the detection target when a total value, which is obtained by totalizing the heterogeneous target certainty degrees of the estimated heterogeneous targets, is greater than or equal to a predetermined threshold value.

8. The image processing device according to claim 2,
   wherein the detection target detection unit detects the estimated detection target and specifies a detection target certainty degree indicating a certainty degree of the estimated detection target being the detection target;
   wherein the heterogeneous target determination unit specifies a heterogeneous target certainty degree indicating a certainty degree of the estimated heterogeneous target being the corresponding heterogeneous target for every estimated heterogeneous target when determined that the estimated detection target is the estimated heterogeneous target; and
   wherein the detection target determination unit determines whether or not the estimated detection target is the detection target based on the heterogeneous target certainty degree of each estimated heterogeneous target and the detection target certainty degree.

9. The image processing device according to claim 1,
   wherein the detection target detection unit detects the estimated detection target and specifies a detection target certainty degree indicating a certainty degree of the estimated detection target being the detection target, and
   wherein the heterogeneous target determination unit determines a content of class or number of classes of the estimated heterogeneous target to determine based on the detection target certainty degree of the estimated detection target detected by the detection target detection unit.

10. The image processing device according to claim 9, wherein the detection target determination unit determines that the estimated detection target is not the detection target when the heterogeneous target determination unit determines that the estimated detection target is the estimated heterogeneous target.

11. The image processing device according to 9, wherein the detection target determination unit determines that the estimated detection target is not the detection target when the heterogeneous target determination unit determines that the estimated detection target is an estimated heterogeneous target of a predetermined class.

12. The image processing device according to claim 9, wherein the detection target determination unit determines that the estimated detection target is not the detection target when the heterogeneous target determination unit determines that the estimated detection target is the estimated heterogeneous target for an estimated heterogeneous target of a predetermined number of classes.

13. The image processing device according to claim 9,
   wherein the heterogeneous target determination unit specifies a heterogeneous target certainty degree indicating a certainty degree of the estimated heterogeneous target being a corresponding heterogeneous target for every estimated heterogeneous target when determined that the estimated detection target is the estimated heterogeneous target, and wherein the detection target determination unit determines that the estimated detection target is not the detection target when a total value, which is obtained by totaling the heterogeneous target certainty degrees of the estimated heterogeneous targets, is greater than or equal to a predetermined threshold value.

14. The image processing device according to claim 9, wherein the detection target detection unit detects the estimated detection target and specifies a detection target certainty degree indicating a certainty degree of the estimated detection target being the detection target;

wherein the heterogeneous target determination unit specifies a heterogeneous target certainty degree indicating a certainty degree of the estimated heterogeneous target being the corresponding heterogeneous target for every estimated heterogeneous target when determined that the estimated detection target is the estimated heterogeneous target; and wherein the detection target determination unit determines whether or not the estimated detection target is the detection target based on the heterogeneous target certainty degree of each estimated heterogeneous target and the detection target certainty degree.

15. The image processing device according to claim 1, wherein the detection target determination unit determines that the estimated detection target is not the detection target when the heterogeneous target determination unit determines that the estimated detection target is the estimated heterogeneous target.

16. The image processing device according to claim 1, wherein the heterogeneous target determination unit specifies a heterogeneous target certainty degree indicating a certainty degree of the estimated heterogeneous target being a corresponding heterogeneous target for every estimated heterogeneous target when determined that the estimated detection target is the estimated heterogeneous target, and wherein the detection target determination unit determines that the estimated detection target is not the detection target when a total value, which is obtained by totaling the heterogeneous target certainty degrees of the estimated heterogeneous targets, is greater than or equal to a predetermined threshold value.

17. The image processing device according to claim 16, wherein the detection target determination unit multiplies a predetermined weighting value defined in advance for every estimated heterogeneous target to each heterogeneous target certainty degree of each estimated heterogeneous target, and determines whether or not the estimated detection target is the detection target based on a plurality of heterogeneous target certainty degrees after the multiplication.

18. The image processing device according to claim 1, wherein the detection target detection unit detects the estimated detection target and specifies a detection target certainty degree indicating a certainty degree of the estimated detection target being the detection target;

wherein the heterogeneous target determination unit specifies a heterogeneous target certainty degree indicating a certainty degree of the estimated heterogeneous target being the corresponding heterogeneous target for every estimated heterogeneous target when determined that the estimated detection target is the estimated heterogeneous target; and wherein the detection target determination unit determines whether or not the estimated detection target is the detection target based on the heterogeneous target certainty degree of each estimated heterogeneous target and the detection target certainty degree.

19. An image processing method configured to detect a detection target, which is all or a part of a predetermined main body on an image, comprising:

a detection step of detecting an estimated detection target which is assumed to be the detection target from the image;

a heterogeneous target determining step of determining whether the estimated detection target detected in the detection target detecting step is an estimated heterogeneous target which is assumed to be a heterogeneous target, which is all or a part of a main body different in class from the main body; and a detection target determining step determining whether the estimated detection target detected in the detection target detecting step is the detection target based on a determination result of the heterogeneous target determining step.

20. A non-transitory computer readable medium storing a control program that operates the image processing device according to claim 1.

* * * * *